US011903476B2

(12) United States Patent
Tokunaga

(10) Patent No.: US 11,903,476 B2
(45) Date of Patent: Feb. 20, 2024

(54) INFORMATION PROCESSING APPARATUS, METHOD OF CONTROLLING INFORMATION PROCESSING APPARATUS, AND METHOD OF GENERATING LEARNING MODEL

(71) Applicant: Canon Kabushiki Kaisha, Tokyo (JP)

(72) Inventor: Natsumi Tokunaga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 591 days.

(21) Appl. No.: 17/124,841

(22) Filed: Dec. 17, 2020

(65) Prior Publication Data
US 2021/0196023 A1    Jul. 1, 2021

(30) Foreign Application Priority Data

Dec. 27, 2019  (JP) ................................ 2019-239150

(51) Int. Cl.
A45D 29/00 (2006.01)
G06N 20/00 (2019.01)
G06V 40/10 (2022.01)
G06V 10/764 (2022.01)
G06V 10/774 (2022.01)
G06V 10/82 (2022.01)

(52) U.S. Cl.
CPC ............. A45D 29/00 (2013.01); G06N 20/00 (2019.01); G06V 10/764 (2022.01); G06V 10/774 (2022.01); G06V 10/82 (2022.01); G06V 40/107 (2022.01); A45D 2029/005 (2013.01)

(58) Field of Classification Search
CPC .. A45D 29/00; A45D 2029/005; G06N 20/00; G06N 3/044; G06N 3/045; G06N 3/08; G06V 10/764; G06V 10/774; G06V 10/82; G06V 40/107
See application file for complete search history.

(56) References Cited

U.S. PATENT DOCUMENTS

| 2013/0038648 | A1* | 2/2013 | Kasahara | ................. B41J 3/407 |
| | | | | 347/2 |
| 2017/0154214 | A1* | 6/2017 | Freeman | .................... G06T 7/75 |
| 2019/0084331 | A1* | 3/2019 | Kasahara | ............. B41M 5/0088 |
| 2019/0095747 | A1* | 3/2019 | Sasaki | ...................... G06T 7/181 |

(Continued)

FOREIGN PATENT DOCUMENTS

JP    2019113972 A    7/2019

OTHER PUBLICATIONS

Wang et al, A Hybrid Approach for Face Alignment, 2017, Pattern Recognition and Image Analysis, 27(3):645-652. (Year: 2017).*

(Continued)

Primary Examiner — John Villecco
Assistant Examiner — Kathleen M Broughton
(74) Attorney, Agent, or Firm — Venable LLP

(57) ABSTRACT

A nail application causes an information processing apparatus to function as a user information input unit that acquires user information, an image display control unit that acquires image data of a finger inclusive of a nail of a user, and a nail detection unit that detects a nail area based on data indicating the nail area in the image data to be outputted from a nail detection model as a consequence of inputting the image data and the user information to the nail detection model.

9 Claims, 14 Drawing Sheets

(56) References Cited

U.S. PATENT DOCUMENTS

2019/0191845 A1* 6/2019 Sasaki .................. G06T 7/12

OTHER PUBLICATIONS

Hung et al, Design and Implement a Smart Nail Machine with Image Segmentation Techniques, 2019, IEEE 8th Global Conference on Consumer Electronics, pp. 1-2. (Year: 2019).*
Dessai et al, Finger Nail Recognition System Using Neural Network, 2018, IEEE I-SMAC Conference, pp. 1-4. (Year: 2018).*

* cited by examiner

INFORMATION PROCESSING APPARATUS, METHOD OF CONTROLLING INFORMATION PROCESSING APPARATUS, AND METHOD OF GENERATING LEARNING MODEL

BACKGROUND OF THE INVENTION

Field of the Invention

The present invention relates to a technique to detect an area in an image by using machine learning.

Description of the Related Art

Printing nail arts on nails by use of a printer has been available in recent years. In the following description, a printer for printing nail arts on nails will be referred to as a nail printer.

Japanese Patent Laid-Open No. 2019-113972 (hereinafter referred to as Literature 1) discloses a technique to detect a contour of a nail by using machine learning in a case where a nail art is printed on the nail with a nail printer.

SUMMARY OF THE INVENTION

According to the technique disclosed in Literature 1, an image of a hand inclusive of the nails is used as learning data. However, human nails have various sizes and shapes that reflect environments, geographical areas, ages, genders, and other features and the learning that depends solely on the image of the hand inclusive of the nails may lead to erroneous detection of nails of a user.

A method of controlling an information processing apparatus according to an aspect of the present invention includes an acquiring step of acquiring image data of a finger inclusive of a nail of a user and user information on the user, and a detecting step of detecting a nail area in the image data acquired in the acquiring step based on data indicating the nail area in the image data to be outputted from a learning model as a consequence of inputting the image data and the user information acquired in the acquiring step to the learning model.

Further features of the present invention will become apparent from the following description of exemplary embodiments with reference to the attached drawings.

DESCRIPTION OF THE EMBODIMENTS

Embodiments of the present invention will be described below in detail. While the following embodiments represent examples for describing the present invention, it is not intended to limit the scope of the present invention only to the embodiments. Various modifications of the present invention are possible without departing from the gist of the invention.

First Embodiment

<System Configuration>

This embodiment represents an aspect constructed with a system including an information processing apparatus and a printer. In this embodiment, the information processing apparatus will be described by using a tablet terminal as an example. However, the information processing apparatus is not limited only to the tablet terminal. Various apparatuses can be used as the information processing apparatus, such as a mobile terminal, a notebook PC, a smartphone, a personal digital assistant (PDA), and a digital camera. Meanwhile, various printers including an inkjet printer, a monochrome printer, a 3D printer, and the like can be used as the printer in this embodiment. In addition, the printer of this embodiment may be a multi-function printer equipped with multiple functions including a copier function, a facsimile function, a printer function, and the like. The printer of this embodiment has a function to directly draw an image on a nail of a human hand. Although this embodiment describes the information processing apparatus and the printer as separate devices, the embodiment may adopt an apparatus that integrally includes the functions of these devices.

Figure 1A:
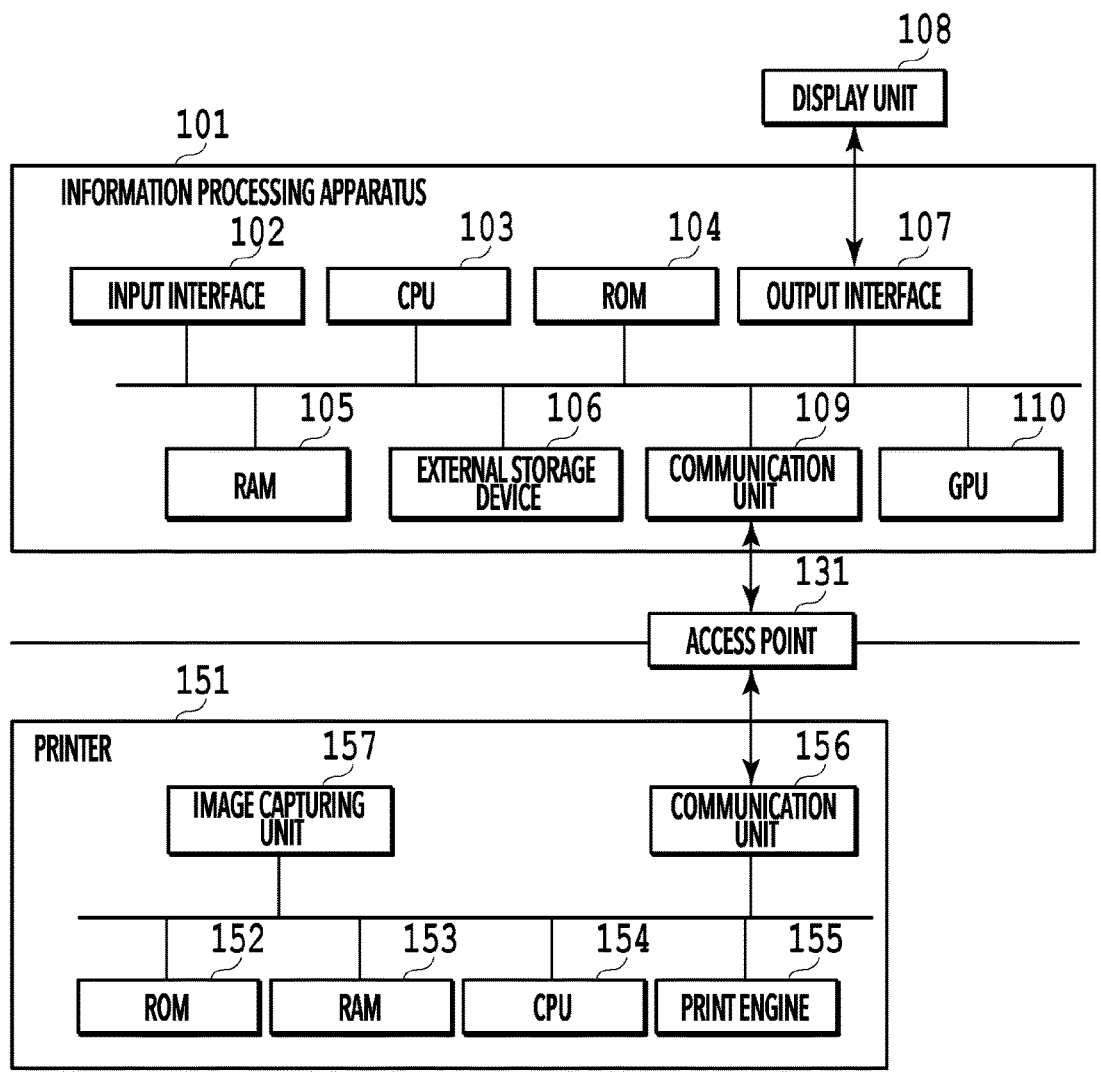
FIGS. 1A and 1B are schematic diagrams showing a system configuration.
Figure 1B:
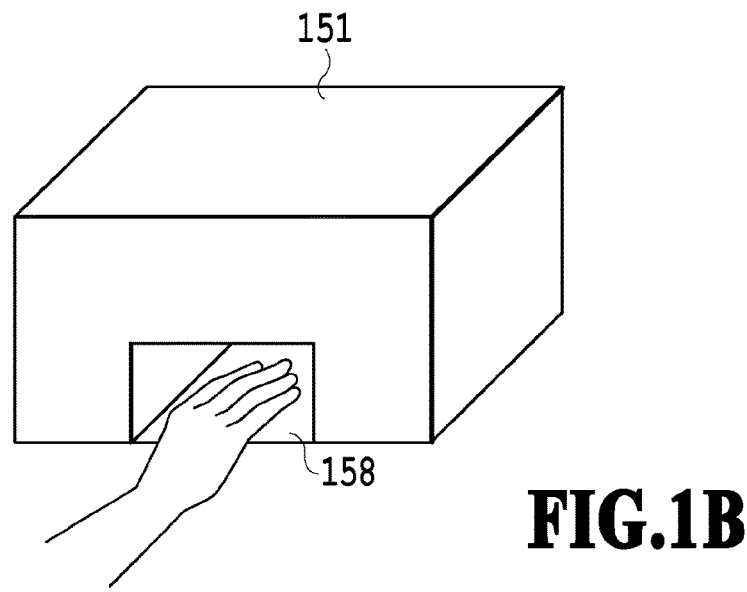

FIGS. 1A and 1B are diagrams describing a system that includes an information processing apparatus 101 and a printer 151 of this embodiment. FIG. 1A illustrates a block diagram of the information processing apparatus 101 and the printer 151. FIG. 1B illustrates a schematic diagram of external appearance of the printer 151. Now, configurations of the information processing apparatus 101 and the printer 151 will be described below with reference to FIGS. 1A and 1B.

<Information Processing Apparatus>

As shown in FIG. 1A, the information processing apparatus 101 includes an input interface 102, a CPU 103, a ROM 104, a RAM 105, an external storage device 106, an output interface 107, a communication unit 109, and a GPU 110. These constituents are connected to one another through a system bus.

The input interface 102 is an interface for accepting data input or an operating instruction from a user through an operating unit (not shown) such as a physical keyboard, buttons, and a touch panel. In this embodiment, a display unit 108 to be described later is integrated with at least part of the operating unit and is configured to conduct output of a screen and acceptance of an operation by the user on the same screen, for example.

The CPU 103 is a system control unit that controls the entire information processing apparatus 101 including execution of programs, activation of hardware, and the like. The ROM 104 stores data such as control programs to be executed by the CPU 103, data tables, an embedded operating system (hereinafter referred to as an OS), and other programs. In this embodiment, the respective control programs stored in the ROM 104 perform software execution control such as scheduling, task switching, and interrupt processing under the management of the embedded OS stored in the ROM 104.

The RAM 105 is formed from a static random access memory (SRAM), a DRAM, or the like. Here, data in the RAM 105 may be retained by using a not-illustrated backup primary battery. In this case, the RAM 105 can store data such as program control variables without volatilizing the data. Moreover, the RAM 105 is also provided with a memory area for storing setting information on the information processing apparatus 101, management data for the information processing apparatus 101, and the like. In addition, the RAM 105 is also used as a main memory and a working memory for the CPU 103.

The external storage device 106 stores applications that provide a print execution function, a print information generation program used to generate print information interpretable by the printer 151, and the like. Moreover, the external storage device 106 stores various programs including an information transmission reception control program used to transmit and receive information to and from the printer 151 connected through the communication unit 109, and a variety of information used by these programs.

The output interface 107 is an interface that performs control including display of data on the display unit 108, notification of a status of the information processing apparatus 101, and the like.

The display unit 108 is formed from light emitting diodes (LEDs), a liquid crystal display (LCD), or the like and is configured to display the data, to notify of the status of the information processing apparatus 101, and so forth. Here, a software keyboard provided with numerical value input keys, a mode setting key, a determination key, a cancellation key, a power key, and the like may be installed on the display unit 108 so as to accept the input from the user through the display unit 108. Meanwhile, the display unit 108 may be configured as a touch panel display unit as mentioned above. The display unit 108 is connected to the system bus through the output interface 107.

The communication unit 109 is connected to an external apparatus such as the printer 151 and is configured to execute data communication. The communication unit 109 is connectable to an access point (not shown) in the printer 151, for example. By connecting the communication unit 109 to the access point in the printer, the information processing apparatus 101 and the printer 151 are capable of wirelessly communicating with each other. Here, the communication unit 109 may directly communicate with the printer 151 by way of the wireless communication or communicate with the printer 151 through an external access point (an access point 131) that is present on the outside. Examples of the wireless communication method include Wireless Fidelity (Wi-Fi) (a registered trademark) and Bluetooth (a registered trademark). Meanwhile, examples of the access point 131 include devices such as a wireless LAN router. In this embodiment, a mode of connecting the information processing apparatus 101 directly to the printer 151 without the intermediary of the access point 131 will be referred to as a direct connection mode. On the other hand, a mode of connecting the information processing apparatus 101 to the printer 151 through the external access point 131 will be referred to as an infrastructure connection mode. Note that the information processing apparatus 101 may be connected to the printer 151 by wire instead.

The GPU 110 stands for a graphics processing unit. This embodiment conducts processing by using a learning model. The GPU 110 can perform efficient calculations by conducting parallel processing of multiple data. In this context, it is effective to perform the processing by using the GPU 110 in the case where learning is carried out for many times by using the learning model as in deep learning. Accordingly, in this embodiment, the GPU 110 is used in addition to the CPU 103 in the processing that uses the learning model. To be more precise, the CPU 103 and the GPU 110 performs calculations in tandem in the case of executing a learning program to learn the learning model. Meanwhile, only the CPU 103 or the GPU 110 may perform calculations in the processing that uses a learned learning model.

In this embodiment, the information processing apparatus 101 is assumed to store a prescribed application in the ROM 104, the external storage device 106, or the like. The prescribed application is an application program for transmitting a print job for printing nail art data to the printer 151 in response to an operation by a user, for example. The application having the aforementioned function will be hereinafter referred to as a nail application. Note that the nail application may include functions other than the print function. For example, the nail application in this embodiment may include a function to activate a camera in an image capturing unit 157 of the printer 151 through the communication with the printer 151. Specifically, the nail application may include a function to transmit a camera activation job to the printer 151. In the meantime, the prescribed application stored in the ROM 104, the external storage device 106, or the like is not limited to the nail application but may be an application program having a function other than the printing.

<Printer>

The printer 151 includes a ROM 152, a RAM 153, a CPU 154, a print engine 155, a communication unit 156, and the image capturing unit 157. These constituents are connected to one another through a system bus. In addition, the printer 151 includes a print target insertion portion 158 which is a space for inserting a print target. FIG. 1B is a schematic diagram showing external appearance of the printer 151. As shown in FIG. 1B, the print target insertion portion 158 is provided inside the printer 151. FIG. 1B illustrates a state where a user puts the user's own hand into the print target insertion portion 158. As described above, in this embodiment, a hand of a person is assumed to be inserted into the print target insertion portion 158. In the meantime, the print target is a nail in this embodiment.

The ROM 152 stores data such as control programs to be executed by the CPU 154, data tables, and an OS program. In this embodiment, the respective control programs stored in the ROM 152 perform software execution control such as scheduling, task switching, and interrupt processing under the management of the embedded OS stored in the ROM 152.

The RAM 153 is formed from an SRAM, a DRAM, or the like. Here, data in the RAM 153 may be retained by using a not-illustrated backup primary battery. In this case, the RAM 153 can store data such as program control variables without volatilizing the data. Moreover, the RAM 153 is also provided with a memory area for storing setting information on the printer 151, management data for the printer 151, and the like. In addition, the RAM 153 is also used as a main memory and a working memory for the CPU 154, so that the RAM 153 can temporarily store print information and a variety of other information received from the information processing apparatus 101.

The CPU 154 is a system control unit that controls the entire printer 151 through execution of programs and activation of hardware. The print engine 155 forms an image on a print target medium such as a nail inserted into the print target insertion portion 158 by using printing agents such as inks based on information stored in the RAM 153 or a print job that is received from the information processing apparatus 101.

The communication unit 156 includes an access point serving as the access point in the printer 151 to be connected to an external apparatus such as the information processing apparatus 101. This access point is connectable to the communication unit 109 of the information processing apparatus 101. The communication unit 156 may communicate directly with the information processing apparatus 101 by wireless communication or communicate with the information processing apparatus 101 through the external access point 131. In the meantime, the communication unit 156 may be provided with hardware that functions as an access point or may be operated as an access point by using software that causes the communication unit 156 to function as the access point.

The image capturing unit 157 is a device equipped with an image capturing function. The device equipped with the image capturing function is attached to and installed in the printer 151. The image capturing unit 157 has functions to capture an image of a prescribed area including the print target (the nail) inserted into the print target insertion portion 158, and to send the captured image (either a still image or a video image) to the information processing apparatus 101 in real time. In this embodiment, the image capturing unit 157 is configured to capture video images. The device equipped with the image capturing function is a camera module that includes at least a lens and an image sensor. The lens captures the print object inserted into the print target insertion portion 158 and forms its image on the image sensor. Any of a smartphone, a mobile terminal, a digital camera, and the like may be used as the device equipped with the image capturing function instead as long as such a device has the aforementioned function. The print engine 155 performs printing on the print target inserted into the print target insertion portion 158.

Here, a memory such as an external HDD and an SD card may be attached to the printer 151, and the information to be stored in the printer 151 may be stored in this memory. Note that the configurations shown in FIGS. 1A and 1B are mere examples and the information processing apparatus 101 and the printer 151 may include additional constituents. However, a descriptions of such additional constituents will be omitted herein.

<Definition of Terms>

Next, terms used in this embodiment will be described. This embodiment represents a mode of printing nail arts mainly on the nails. Moreover, this embodiment represents a mode of providing (printing) the nail arts on the respective nails of one of the hands. While nail arts to be provided to the nails are generally of the same concept, these nail arts provided to individual nails are not always identical to one another. For example, a nail art set of a design A includes five nail arts (nail arts corresponding to the five nails, respectively) and the five nail arts may be of the same concept but not formed from completely the same patterns. In view of the above, this embodiment will define the following terms.

A term "nail image data" will represent image data of a nail art to be provided to one of the nails.

A term "nail art data" will represent image data of an aggregate of multiple pieces of nail image data. In other words, the nail art data is equivalent to a data set of the pieces of the nail image data. The nail art data is typically the image data that consolidates images of the respective pieces of the nail image data corresponding to the nail arts for the five fingers. The nail art data may be either consolidated data of pieces of the nail image data corresponding to the five nails (that is, the set of the five pieces of the image data), or a piece of image data obtained by combining the five pieces of the nail image data corresponding to the respective nails into the image data of a single image.

As described above, in the case of referring to the "nail image data", this data corresponds to the data of the image of the nail art on each nail. Meanwhile, in the case of referring to the "nail art data", this data corresponds to the data of the set of images of the nail arts on the five nails.

<Outline of Nail Art Printing>

In this embodiment, the CPU 103 of the information processing apparatus 101 activates the nail application by executing a program for the nail application stored in the ROM 104 or the external storage device 106. Then, by using the nail application, the user can print the nail arts on the nails while reflecting the nail image data of the nail art data selected by the user to print areas. Meanwhile, in this embodiment, the nail application automatically sets nail areas by use of a learning model obtained by learning. Furthermore, the nail application performs processing to reflect a result of setting of the nail areas to the learning model (relearning).

An outline of an operation of an example using the nail application will be described below. In the following, a description will be given on the assumption that the user is a person who provides the nail arts to the nails and also operates the nail application. In a first step, the user inputs user information on the application. In a second step, the user selects one set of the nail image data (that is, the nail art data) on the application. In a third step, the user inserts the hand into the nail printer. In a fourth step, the user activates the camera located inside the printer. In a fifth step, the application displays a camera image transmitted from the nail printer. In a sixth step, the application sets nail areas, which are the print areas to print the nail arts, on the displayed camera image by using the learning model. In this instance, the user may manually set the nail areas again as appropriate while correcting the nail areas that have been automatically set by using the learning model. In a seventh step, the user reflects the nail image data included in the nail art data to the print areas thus set. In an eighth step, the application causes the nail printer to execute printing by using the reflected image data. In a ninth step, the application updates the learning model by reflecting the contents corresponding to the operation by the user to the original learning model.

As described above, according to this embodiment, the sixth step includes the processing to set the areas to print the nail arts automatically by using the learning model. The learning model is generated by machine learning. In the following, the series of processing of the nail application mentioned above will be described with reference to the drawings, and a method of generating the learning model (a learning method) will be described thereafter. Although the description has been made herein on the assumption that the user who inserts the hand into the printer 151 and the user who operates the application are the same person (user), these users may be different users instead.

<User Interface of Nail Application>

User interface (hereinafter abbreviated as UI) screens to be displayed by the nail application will be described in advance in order to facilitate the understanding. The UI screens described below are displayed on the display unit 108 by the CPU 103 that executes the nail application. Meanwhile, a description will be given on the assumption that the input interface 102 functions as the operating unit integrated with the display unit 108. In a broad sense, there are two types of UI screens of the nail application in this embodiment. A first UI screen is a selection screen for the nail art data illustrated in FIGS. 2A to 2C. A second UI screen is a print data generation screen illustrated in FIG. 3. Now, the UI screens of the nail application will be described with reference to the illustrated screens.

Figure 2A:
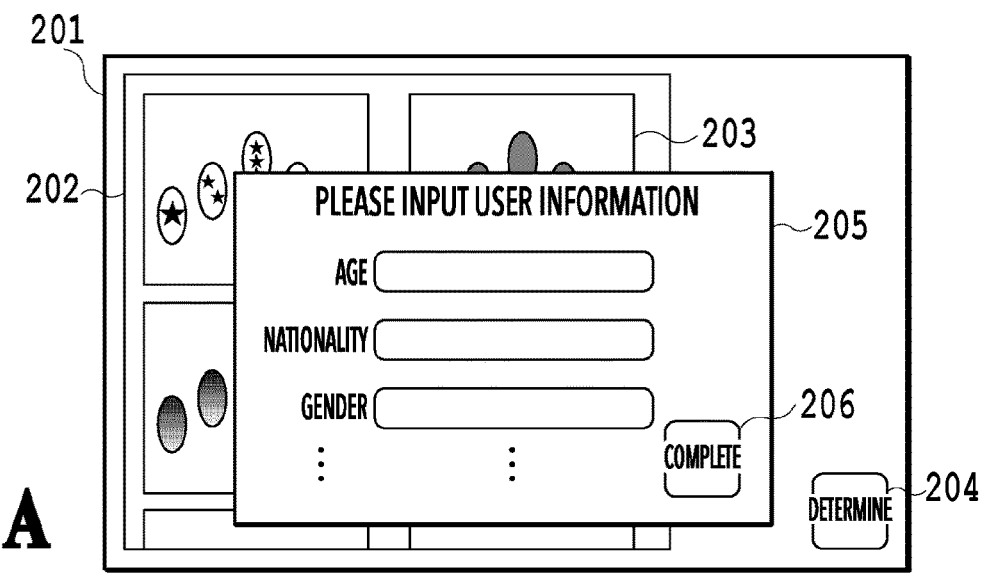
FIGS. 2A to 2C are diagrams for explaining a UI screen that displays a nail art selection screen.
Figure 2B:
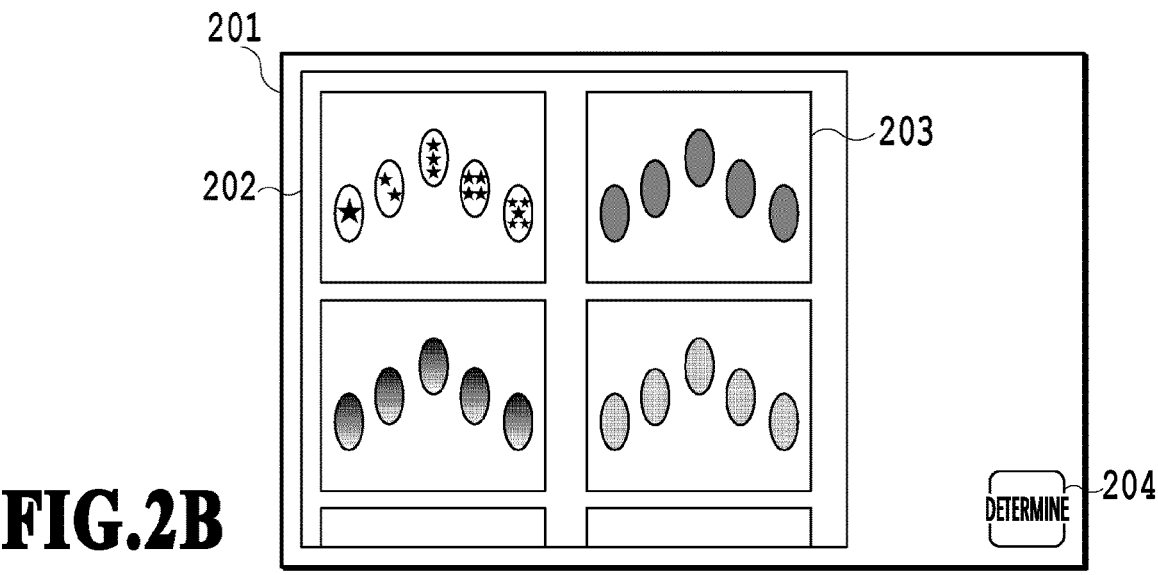
Figure 2C:
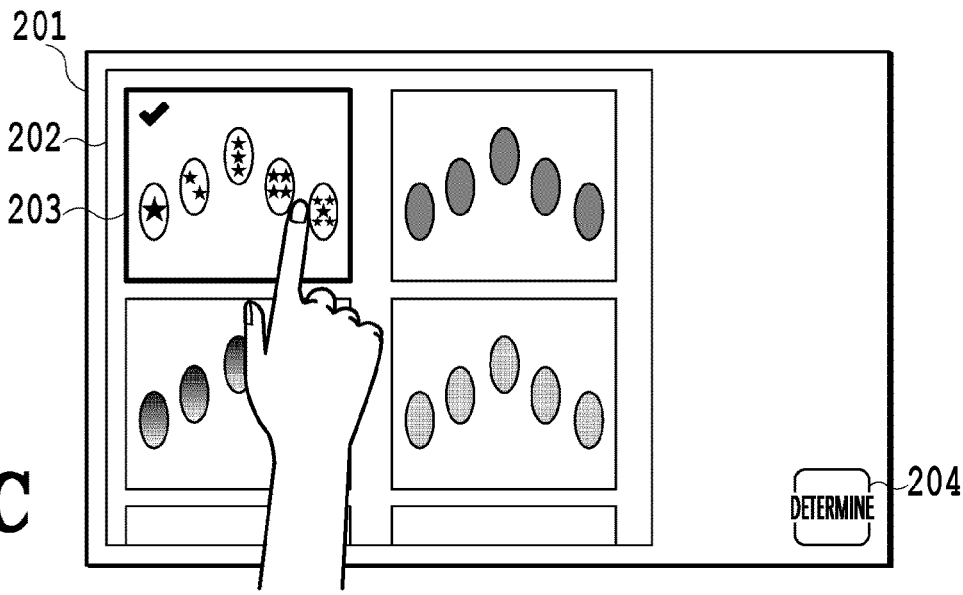

FIGS. 2A to 2C are diagrams for explaining the UI screen (the first UI screen) that displays a nail art data selection screen 201. In this embodiment, user information is inputted prior to selection of the nail art data. The nail art data selection screen 201 shown in FIG. 2A displays a dialog 205 used for inputting the user information. As for an example of a timing to display the dialog 205, this embodiment is assumed to display the dialog 205 at the timing of activating the nail application. This dialog 205 shows an example of inputting an age, a nationality, and a gender as the user information. The user information need only include at least one user attribute. The user inputs the user information indicating one or more user attributes. Here, the user need only input at least one of the attributes displayed on the dialog 205 and does not have to input all the attributes. After inputting the user information, the user presses a completion button 206 and closes the dialog 205. Then, the screen illustrated in FIG. 2B is displayed. The inputted user information is stored in a certain area. Such a storage area may be secured in a database inside the nail application or in a database on a not-illustrated server.

Although the description has been made herein of the example in which the user information is inputted at the time of activation of the nail application prior to the nail art data selection, the present invention is not limited only to this configuration. The user information need only be inputted before the nail areas are set by the learning model as described later. Meanwhile, in the case where the user information is registered with the nail application in advance, the input of the user information illustrated in FIG. 2A may be skipped. In the meantime, the nail art data selection screen 201 in FIG. 2A shows an example of display that overlaps a nail art data display area 202 to be described with reference to FIG. 2B. However, the nail application may display the user information input screen separately instead of the overlap display.

Next, a description will be given of the screen shown in FIG. 2B. The nail art data selection screen 201 shown in FIG. 2B includes the nail art data display area 202 and a nail art data determination button 204.

Multiple sets of the nail art data corresponding to various design concepts of the nail arts to be printed on the nails are displayed in the nail art data display area 202. To be more precise, four sets of nail art data 203 are displayed on the screen illustrated in FIG. 2B. Each set of the nail art data 203 includes five types of nail image data corresponding to the thumb, the index finger, the middle finger, the ring finger, and the little finger, respectively. The user can select one or more sets of the nail art data 203. The user can also cancel the selected nail art data 203.

FIG. 2C is a diagram showing an example of a method of allowing the user to select or cancel the nail art data 203. FIG. 2C illustrates the case where the user selects one set of the nail art data 203 by tapping this nail art data 203 once. The user can also cancel the selective state by tapping the selected nail art data 203 once again.

Figure 3:
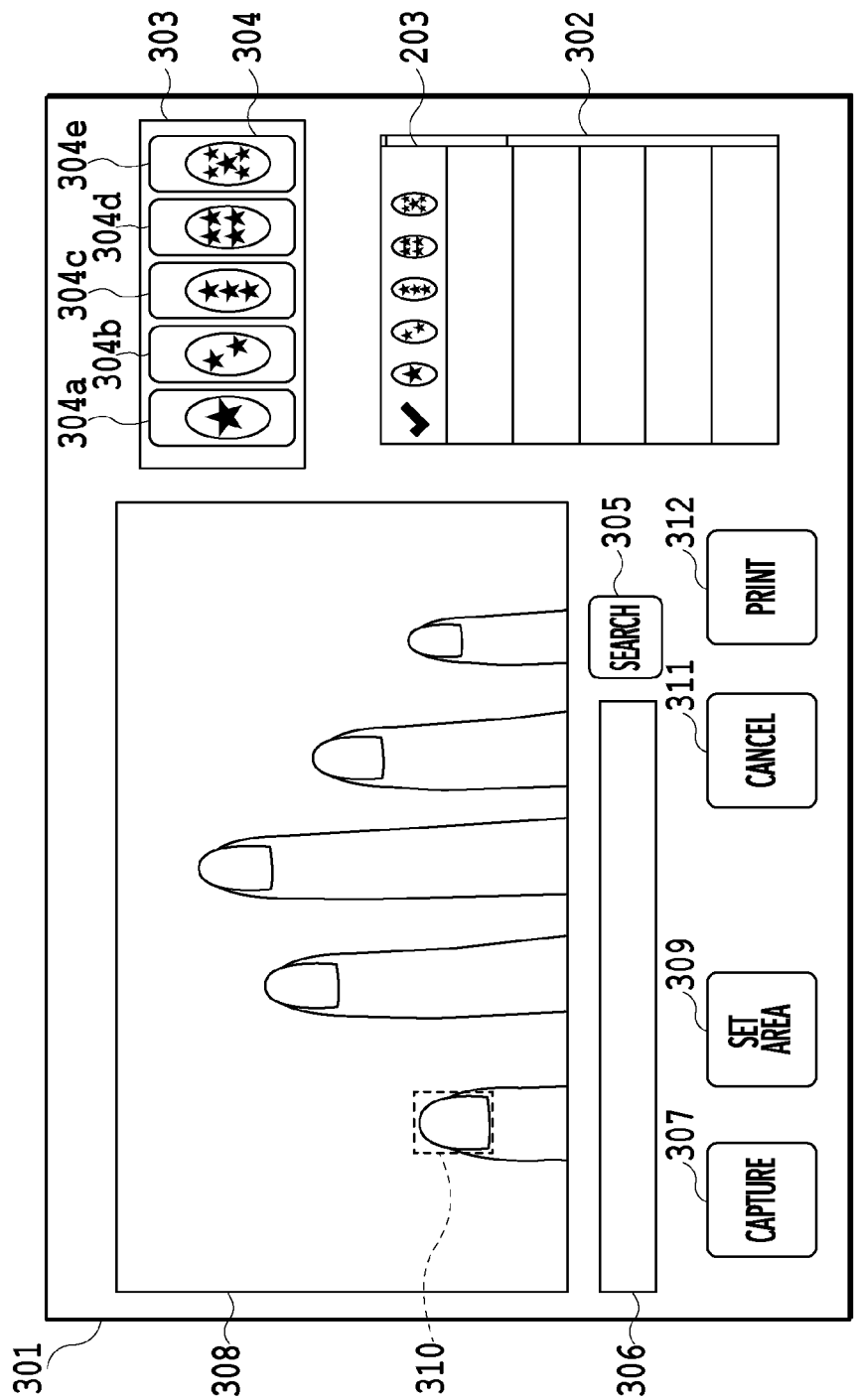
FIG. 3 is a diagram for explaining a UI screen that displays a print data generation screen.

The nail art data determination button 204 has a function to transition to a print data generation screen 301 shown in FIG. 3 on the condition that the user presses this button after selecting one or more sets of the nail art data 203 from the nail art data display area 202.

In this embodiment, an action to operate each of the buttons will be expressed as "pressing". Meanwhile, in the case of operating each of the areas, such an operation will be regarded as an operation of a touch panel and will therefore be described as "tapping", "touching", "pinching in", "pinching out", and so forth. Nonetheless, these expressions are mere examples. For instance, the operation to press each of the buttons may be accomplished by touching the corresponding button on the touch panel. In the meantime, an operation in each area may be conducted by way of a cursor operation while using a mouse, for example. Alternatively, the input interface 102 may be provided with direction buttons and the operation in each area may be performed by using the direction buttons.

FIG. 3 is a diagram for explaining the UI screen (the second UI screen) that displays the print data generation screen 301. The print data generation screen 301 shown in FIG. 3 includes a selected data display area 302, a nail art data determination area 303, a printer search button 305, and a printer name display area 306. The print data generation screen 301 further includes a capture button 307, a video image display area 308, an area set button 309, an image data cancel button 311, and a print button 312. The video image display area 308 includes a print area 310 to be described later.

The selected data display area 302 is an area to display one or more sets of the nail art data 203 selected by the user on the nail art data selection screen 201 for the nail art data 203 shown in FIG. 2B. The user can select one set of the nail art data 203 used for printing from the display in the selected data display area 302. The user can also cancel the selected set of the nail art data 203. An example of a method of selecting or cancelling the nail art data 203 by the user will be shown below. The user can select one set of the nail art data 203 by tapping the relevant set of the nail art data 203 once. Meanwhile, the user can cancel the selective state by tapping the selected nail art data 203 once again. In other words, the user selects one or more designs (the nail art data 203) as candidates for use in printing from multiple print designs on the nail art data selection screen 201 illustrated in FIG. 2B in advance. Then, the user selects the set of the nail art data 203 used for the printing out of the one or more selected print designs (the nail art data 203) on the print data generation screen 301. The nail art data 203 selected from the selected data display area 302 is displayed in the nail art data determination area 303.

The nail art data 203 selected from the selected data display area 302 is displayed in the nail art data determination area 303. Regarding the nail art data to be displayed in the nail art data determination area 303, five types of nail image data 304 are displayed independently of one another. To be more precise, pieces of nail image data 304a to 304e on the nails of the thumb, the index finger, the middle finger, the ring finger, and the little finger are displayed independently of one another. Note that in this specification, a case where a suffix is omitted as in "nail image data 304" will represent targets as a whole while a case where the suffix is included as in the "nail image data 304a" will represent an individual target. In other words, the nail art data determination area 303 displays a nail image group including individual nail images.

In this embodiment, the order of the pieces of the nail image data 304 displayed in the nail art data determination area 303 can be changed as described later. For example, the nail image data 304a for the nail on the thumb and the nail image data 304c for the nail on the middle finger can be replaced with each other. In this way, the pieces of the nail image data 304 displayed in the nail art data determination area 303 can be treated as individual pieces of image data. Here, the nail image data 304 to be displayed in the nail art data determination area 303 may be pieces of image data that are obtained by separating images included in the nail art data 203 from one another. Alternatively, individual pieces of nail image data 304 corresponding to the nail art data 203 may be prepared in advance, and the corresponding individual pieces of nail image data 304 may be displayed in the nail art data determination area 303, respectively.

Meanwhile, the pieces of the nail image data 304 displayed in the nail art data determination area 303 need only be capable of being treated as the individual pieces of image data and the pieces of the nail image data 304 do not always have to be visually distinguishable as the individual pieces of image data on a display screen. FIG. 3 shows an example in which the pieces of the nail image data 304 are displayed as separate images. In the meantime, as in the case of the nail art data 203 displayed in the selected data display area 302, for example, the pieces of the nail image data 304 may be displayed in the nail art data determination area 303 in such a way that no boundary is displayed in a space between every two adjacent nail images. In this case, each piece of data need only be capable of being internally processed in the nail application as the individual piece of image data based on positional information on the corresponding nail in the images of the one set of the nail art data 203.

The printer search button 305 is a button to implement a function to search for the printer 151 that can communicate with the nail application on the condition that this button is pressed by the user. In the case where the printer 151 is discovered as a result of the search, the nail application displays information that specifies the discovered printer 151.

Figure 4:
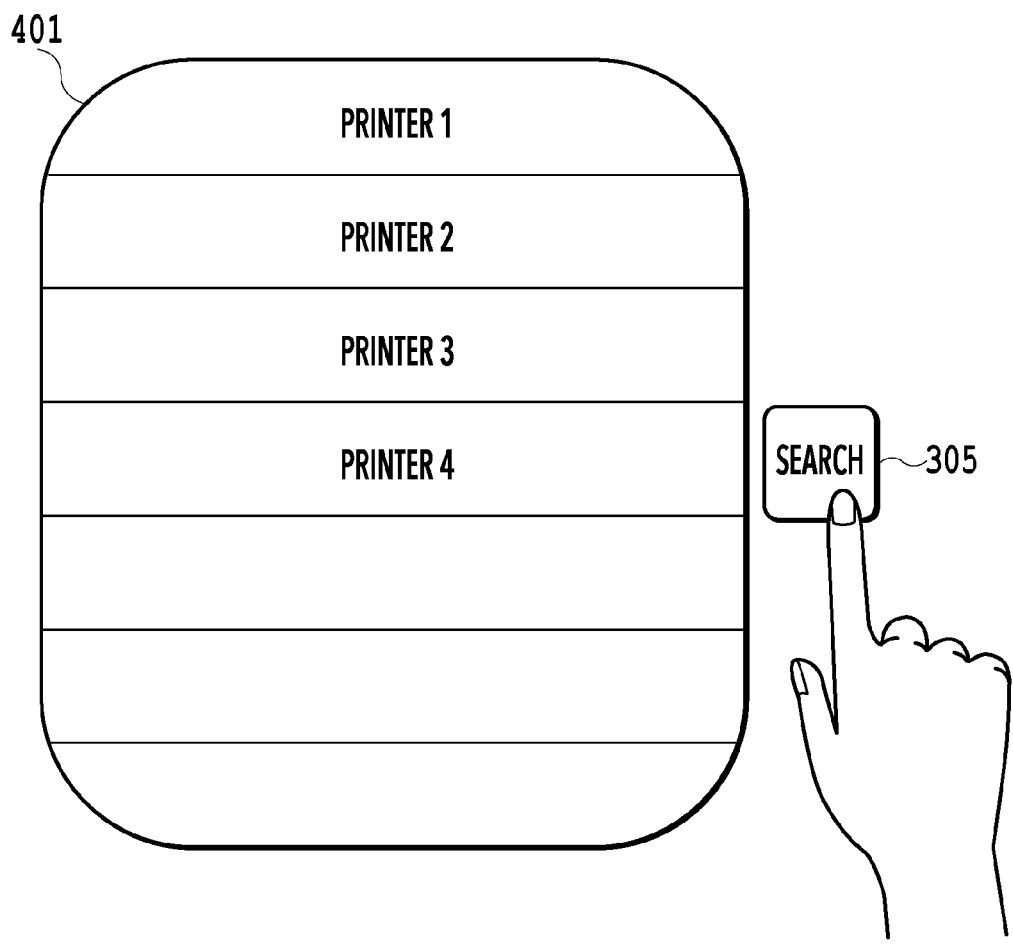
FIG. 4 is a diagram of a screen that displays a printer list.

FIG. 4 is a screen that shows a printer list 401 for the printers 151 discovered by the nail application as a result of the search conducted in response to the press of the printer search button 305. Here, printer names, printer model names, and the like of the discovered printers are displayed as the printer list 401. The user can select one of the printers 151 from the above-described printer list 401 at the discretion of the user, and the selected printer 151 is displayed in the printer name display area 306.

The capture button 307 is a button to communicate with the printer 151 displayed in the printer name display area 306 on the condition that this button is pressed by the user, and then to receive a video image captured with the image capturing unit 157 of the printer 151 in real time and to display the received image on the video image display area 308. In this embodiment, a hand of a person is assumed to be inserted into the print target insertion portion 158. Accordingly, as the user inserts one of the hands and presses the capture button 307 on a UI screen 301 with the other hand, for example, an image of finger tips including the nails of the user is displayed in the video image display area 308 in real time. Note that the aforementioned mode of use is a mere example. For instance, a customer of a nail salon may insert one of the hands and a staff member of the nail salon may press the capture button 307 on the UI screen 301.

The area set button 309 is a button to be pressed by the user in the case where the video image is displayed in the video image display area 308, so as to transition to an area setting mode to allow the user to set the print area 310 in the displayed video image. In this embodiment, the print area 310 corresponds to a nail area that represents the contour of the nail. In FIG. 3 or in FIGS. 5A to 5C and the like to be described later, the print area 310 is indicated as a rectangular area in a dotted line that encompasses a nail for the convenience of explanation. However, in the actual nail application, the print area 310 is set to an area of a nail in conformity to the contour of that nail.

Figure 5A:
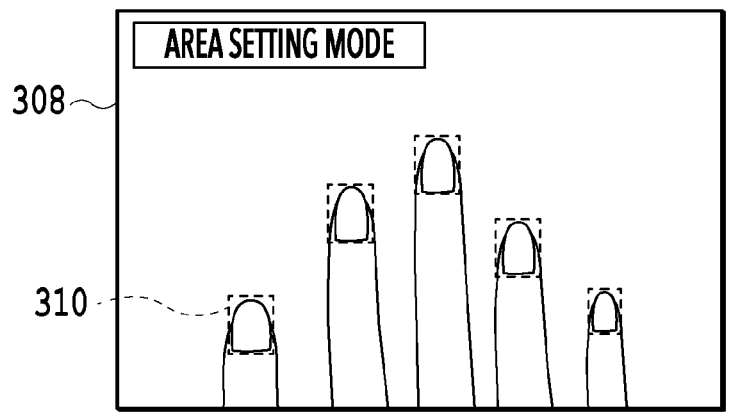
FIGS. 5A to 5C are diagrams for explaining an example of setting print areas.
Figure 5B:
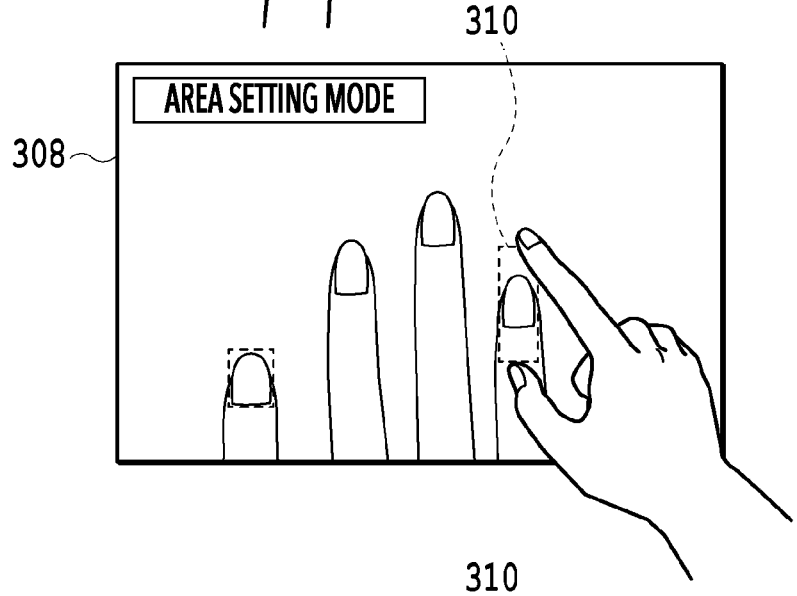
Figure 5C:
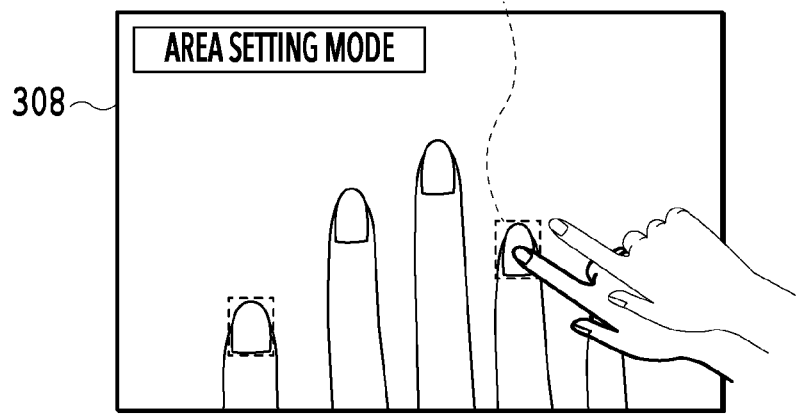

FIGS. 5A to 5C are diagrams for explaining an example in which the nail application transitions to the area setting mode that enables setting of the print area 310 in response to pressing the area set button 309. In this embodiment, the nail application includes processing to set the print area 310 by automatically detecting a nail area from a video image. FIG. 5A is a diagram showing an example of a method of automatically detecting nail areas from a video image. First, the user presses the area set button 309 so as to cause the video image display area 308 to transition to the area setting mode. As the video image display area 308 transitions to the area setting mode, the nail application generates a still image of the hand inclusive of the nails of the user from the video image. Then, the nail application automatically detects the nail areas from the still image and sets the print areas 310. In this embodiment, the nail application inputs the user information and image data of the still image of the hand inclusive of the nails of the user to the learning model, thereby acquiring data indicating the nail areas obtained by and outputted from the learning model. Details of processing that uses the learning model will be described later. The nail application automatically sets the print areas 310 in the areas corresponding to the respective nails as shown in FIG. 5A based on the data indicating the nail areas which is outputted from the learning model.

Note that the user can freely change the automatically set print areas 310. Moreover, the user can also delete any of the set print areas 310. FIG. 5B is a diagram showing an example of a method of changing the size of a print area. As shown in FIG. 5B, if the user taps the set print area 310, the tapped print area 310 transitions to a selective state. The user can expand or contract the line defining the print area 310 by an operation using the fingers. FIG. 5B illustrates an example of expanding the print area 310. Meanwhile, after the user taps the print area 310 that the user wants to change, the user can change the print area 310 by tracing the nail area by using a finger, a stylus pen, or the like. In this way, the user can edit a width, a length, and an angle of the contour of each nail.

FIG. 5C is a diagram showing an example of deleting the set print area 310. As shown in FIG. 5C, the user can delete the set print area 310 by double tapping the set print area 310.

The nails that the user wants to put the nail arts on may be the nails of all the fingers of the hand or some of the fingers thereof. Accordingly, in this embodiment, the user can set the desired print areas 310. In the meantime, the print areas 310 being areas that represent targets for printing by reflecting the image are assumed to be the nails of the user. For this reason, the sizes of the print areas 310 to be set may be of various sizes that are different from one another. Therefore, processing to output appropriate nail areas from the learning model is carried out in this embodiment based on the actual image of the nails obtained by insertion of the hand of the user into the printer 151 and on the user information. The nail application displays the nail areas so as to be visually distinguishable by the user. This makes the user possible to change the print areas 310 as appropriate while checking the nail images. By setting the print areas 310 suitable for the respective nails as described above, it is possible to print the nail arts at appropriate positions of the nails. Note that this embodiment will be described on the assumption that the user sets five print areas 310.

Here, the print areas 310 that are set once may be tracked by image recognition processing and the like. For example, in a case where a position of a finger (or a nail) is shifted in the printer 151 after the user sets the print area 310 thereof, the print area 310 may be automatically changed by tracking the image area of the set print area 310. Alternatively, the print area 310 may be re-set by using the area obtained by inputting the data again to the learning model as described earlier.

After setting the print areas 310, the nail application performs processing to reflect the nail image data 304 to the set print areas 310 so as to print the nail arts on the nails of the user. In order to reflect the nail image data 304 to the print areas 310, the nail application associates the five print areas 310 with the five types of nail image data 304a to 304e to begin with.

Figure 6A:
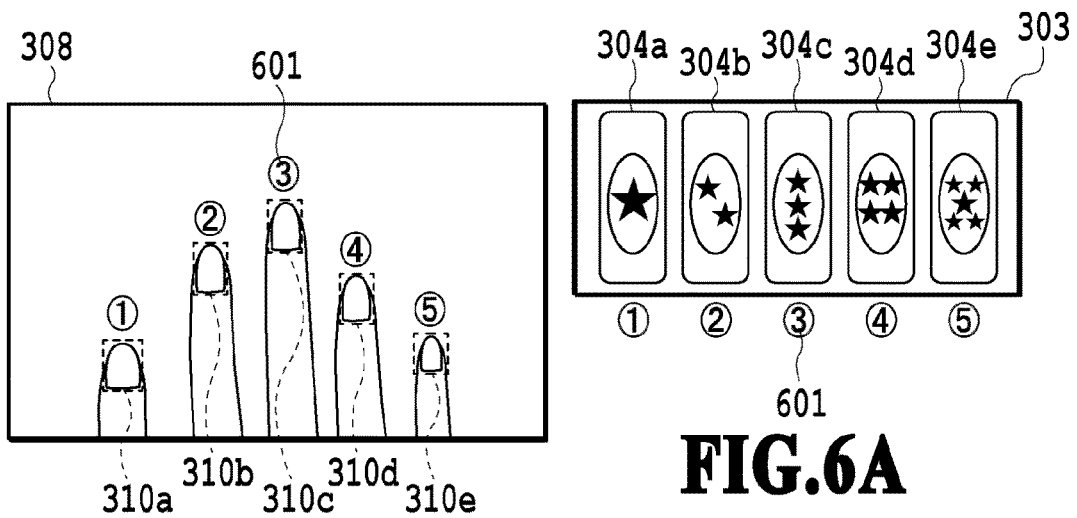
FIGS. 6A to 6C are diagrams for explaining association of the print areas with nail image data.
Figure 6B:
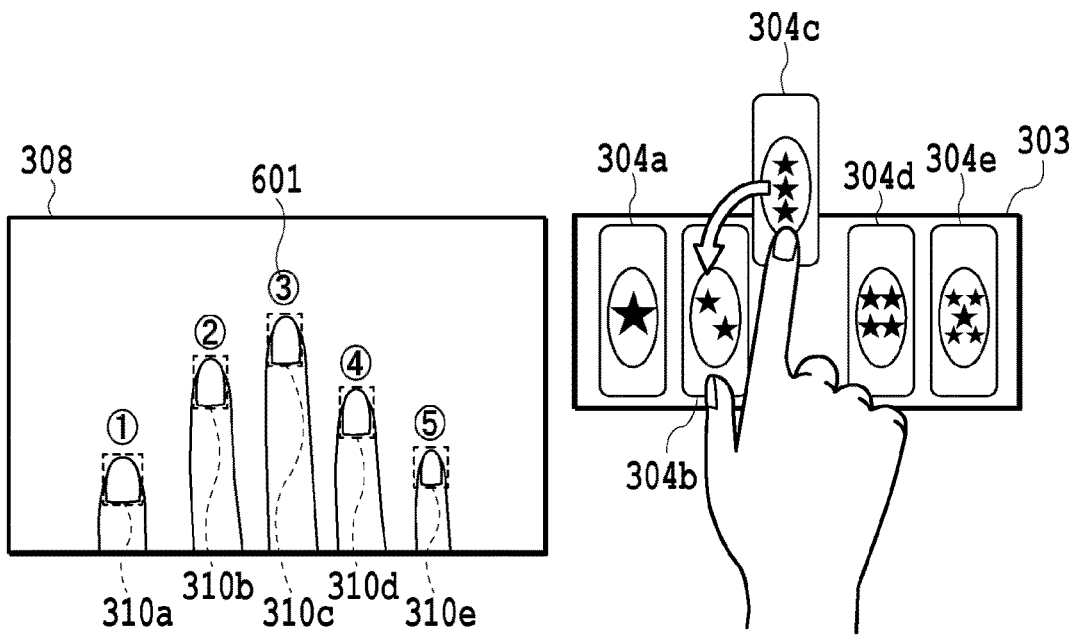
Figure 6C:
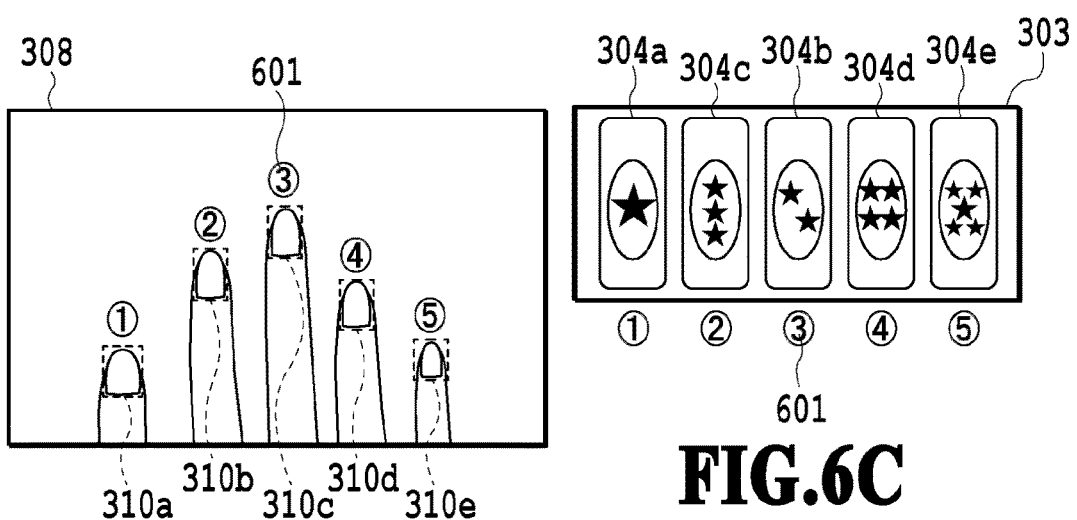

FIGS. 6A to 6C are diagrams for explaining association of the print areas 310 with the nail image data 304. FIG. 6A shows an example of allocating pieces of identification information 601 in ascending order to the five set print areas 310a to 310e and to the five types of the nail image data 304a to 304e, respectively. To be more precise, in the case where the right hand of the user is inserted into the print target insertion portion 158, the nail application allocates the identification information 601 from number 1 to number 5 to the nails on the thumb to the little finger such as number 1 to the nail on the thumb, number 2 to the nail on the index finger, number 3 to the nail on the middle finger, and so forth. Likewise, the nail application also allocates the identification information 601 from number 1 to number 5 to the five types of the nail image data 304 displayed in the nail art data determination area 303 in ascending order such as number 1, number 2, number 3, and so forth from the left end. Specifically, the print area 310a is associated with the nail image data 304a, the print area 310b is associated with the nail image data 304b, and the print area 310c is associated with the nail image data 304c. Moreover, the print area 310d is associated with the nail image data 304d and the print area 310e is associated with the nail image data 304e. The pieces of the identification information 601 thus allocated are displayed in the video image display area 308 so as to be visually distinguishable by the user. Specifically, the pieces of the identification information 601 are displayed near the print areas 310 and the pieces of the nail image data 304, respectively. Note that the identification information 601 need only be capable of associating the areas with the data in the nail application and does not always have to be displayed on the UI screen.

The identification information 601 is continually updated. For example, the user may wish to change the association after checking the identification information displayed in the video image display area 308 and the identification information 601 displayed in the nail image data 304. In this case, the identification information 601 is updated as a consequence of changing the association by the user.

FIGS. 6B and 6C are diagrams showing an example of updating the identification information 601. FIG. 6B shows an example in which the user changes the order of the pieces of the nail image data 304 by dragging and dropping one of the five pieces of the nail image data 304. In this example, the user intends to replace the nail image data 304c that is associated with the print area 310c of the nail of the middle finger with the nail image data 304b that is associated with the print area 310b of the nail of the index finger. In this case, the user drags the nail image data 304c and drops the nail image data 304c in such a way as to place the nail image data 304c on the left side in FIG. 6B, thereby changing the order of the pieces of the nail image data 304. FIG. 6C shows an example in which the pieces of the identification information 601 are updated by reallocating the pieces of the identification information 601 in ascending order from left to right again after changing the order of the pieces of the nail image data 304 as illustrated in FIG. 6B. Specifically, comparing FIG. 6C with FIG. 6B, the positions of the nail image data 304b and the nail image data 304c are replaced with each other and the corresponding pieces of identification information 601 are replaced as well. In other words, the association between the nail image data 304 and the print area 310 is partially changed and the state of change is displayed in such a way as to be visually distinguishable by the user. In the case of performing the operation to change the order of arrangement of the pieces of the nail image data 304 as described above, the reallocation of the pieces of the identification information 601 will take place again.

Note that FIGS. 6A to 6C have described the example of allocating the numbers as the identification information 601 in the case of associating the print area 310 with the nail image data 304. However, any figures can be allocated as long as such figures can specify the association between the print area 310 and the nail image data 304. For example, alphabets may be allocated as the identification information 601 or pictographs and the like may be allocated instead. Meanwhile, five different icons may be allocated. Since it is only necessary to specify the association, background colors of the pieces of the nail image data 304 may be changed from one another and colors of the print areas 310 may also be changed accordingly so that the user can distinguish the association. In short, display specifications of the print areas 310 and the nail image data 304 may be partially changed so that the user can visually distinguish the association. Thereafter, the user performs an operation to reflect the nail image data 304 to the print areas.

Figure 7A:
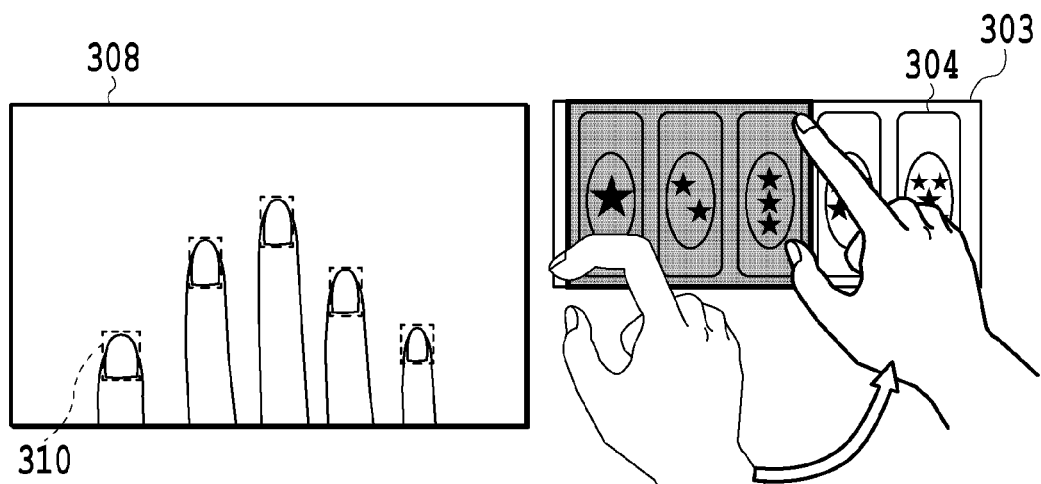
FIGS. 7A to 7C are diagrams showing an example of selection of the nail image data.
Figure 7B:
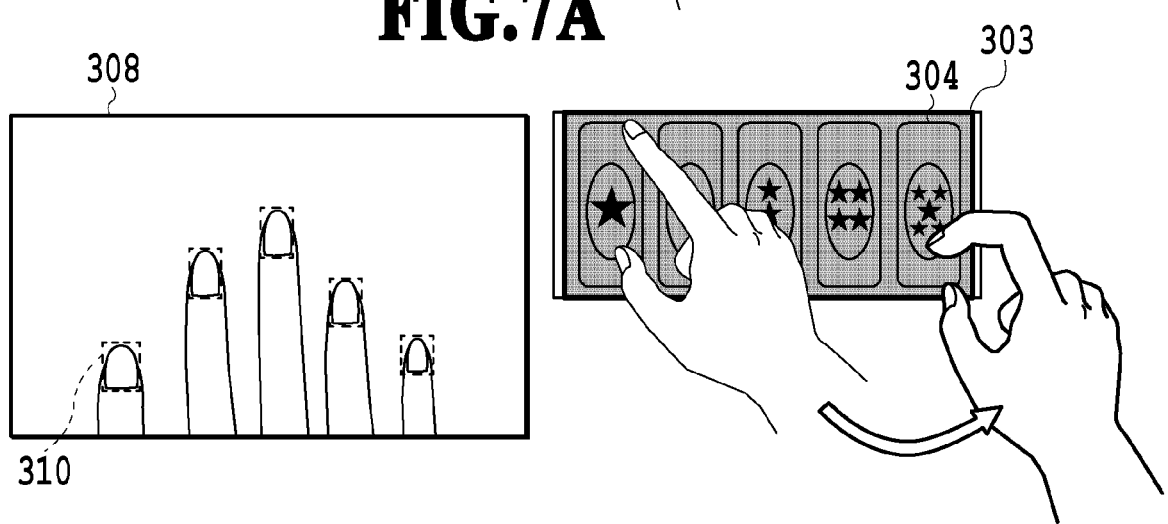
Figure 7C:
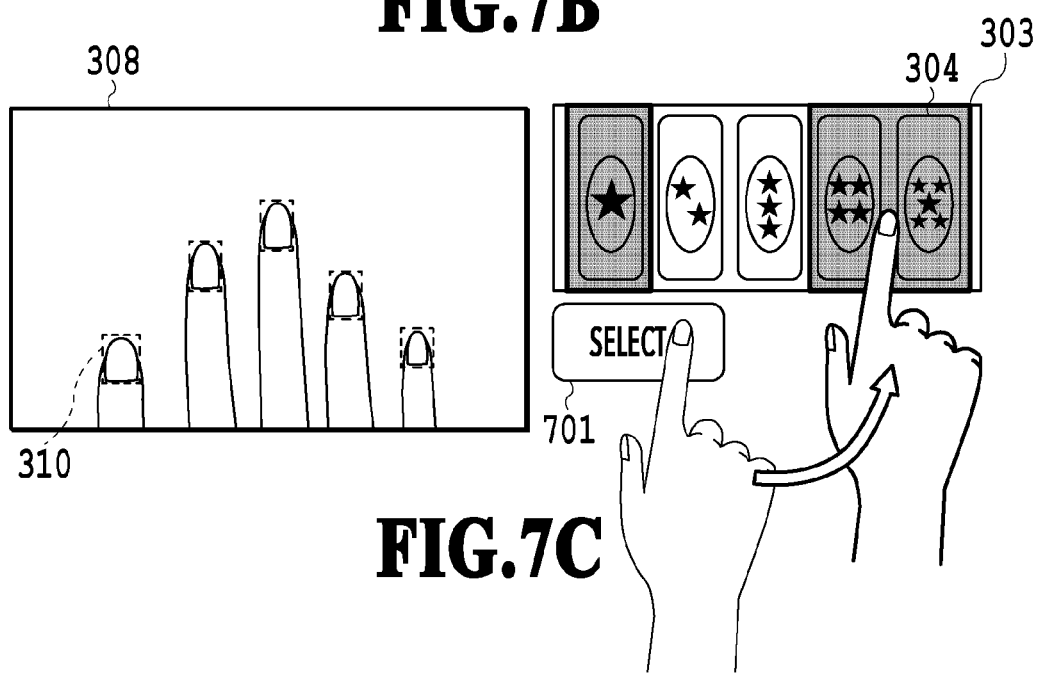

FIGS. 7A to 7C are diagrams showing an example of allowing the user to selects the nail image data 304 to be reflected to the print areas 310. FIG. 7A shows an example in which the user surrounds the selected pieces of the nail image data 304 with a finger by using a pinch-out operation. FIG. 7B shows an example in which the user selects the pieces of the nail image data 304 while moving the finger in such a way as to close a zone of the nail image data 304 by using a pinch-in operation. The pieces of the nail image data 304 in the zone surrounded by pinching in or pinching out will be regarded as the selection by the user. FIG. 7C illustrates another method. FIG. 7C is a diagram showing an example of providing an image data selection button 701 on the print data generation screen 301. The user can select the pieces of the nail image data 304 to be reflected to the print areas 310 by pressing the image data selection button 701 and then tapping one or more pieces of the nail image data 304. The nail application treats the pieces of the nail image data 304 tapped by the user as the selected pieces. The above-described FIGS. 7A to 7C show the examples in which the nail image data 304 is selected with a right hand while inserting another right hand into the print target insertion portion 158. Meanwhile, in the case of operator is the single user, the user is supposed to select the nail image data 304 with the left hand. After selecting the pieces of the nail image data 304, processing to reflect the selected pieces of nail image data 304 to the print areas 310 takes place.

Figure 8A:
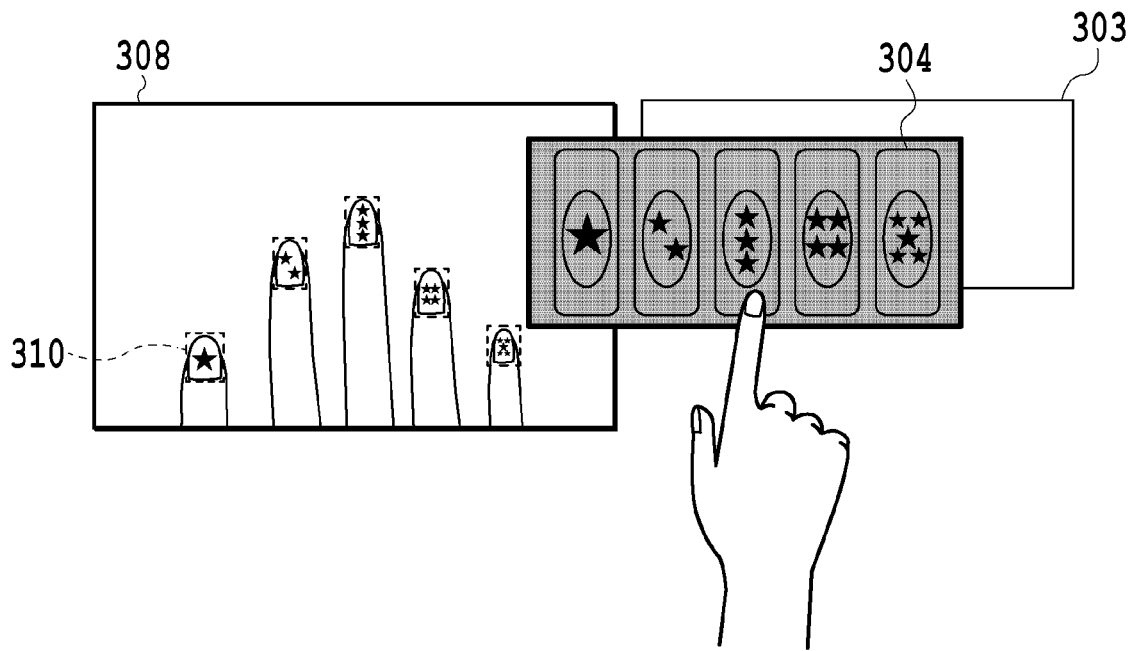
FIGS. 8A and 8B are diagrams showing an example of reflecting the nail image data to the print areas.
Figure 8B:
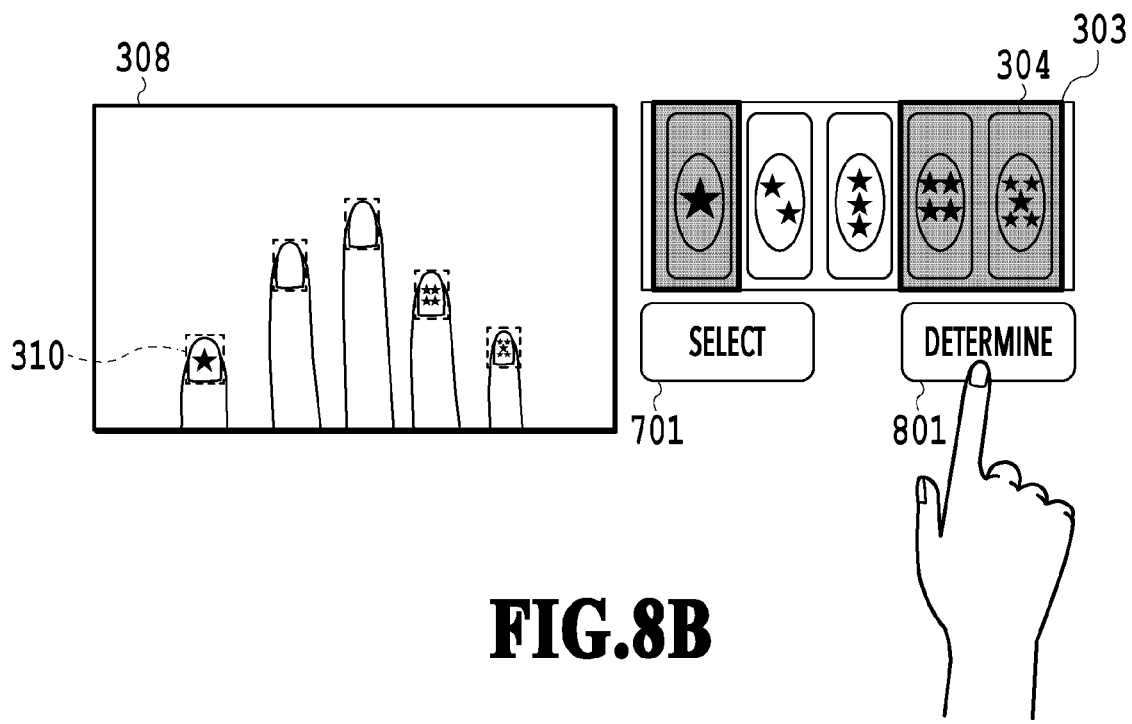

FIGS. 8A and 8B are diagrams showing an example of reflecting the pieces of the nail image data 304 having selected by the user to the print areas 310 of the video image display area 308. FIG. 8A shows an example of dragging and dropping the selected pieces of nail image data 304 in the video image display area 308, thereby reflecting the nail image data 304 to the print areas 310a to 310e associated with the pieces of the nail image data 304a to 304e, respectively. Specifically, as the selected pieces of nail image data 304 are dragged and dropped in the video image display area 308, the nail application determines that selection by the user has been completed and performs the reflection processing. In this instance, the reflection processing may be executed on the condition that part of the selected pieces of nail image data 304 is dropped in the video image display area 308, or in other words, in the case where at least part of the selected pieces of nail image data 304 overlaps the video image display area 308. FIG. 8B illustrates another example. FIG. 8B shows an example of providing an image data determination button 801 on the print data generation screen 301. As the user presses the image data determination button 801, the selection by the user is determined to be completed and the selected pieces of nail image data 304 are reflected to the print areas 310 associated with the pieces of the nail image data 304. In the case where the pieces of the nail image data 304 are reflected to the print areas 310, the images of the pieces of the nail image data 304 are superimposed on the print areas 310 in the video image (the image) displayed in the video image display area 308. In short, the images of the nail arts are displayed as a preview.

As described with reference to FIGS. 7A to 8B, in the case where there are two or more print areas 310, this embodiment is capable of reflecting the pieces of the nail image data 304 in a lump at the time of reflecting the pieces of the nail image data 304 to be applied to the respective print areas 310. Specifically, the nail application associates the print areas 310 with the pieces of the nail image data 304. Then, the user selects the pieces of the nail image data 304 to be reflected out of the entire nail image data 304. Thereafter, the user performs the operation to reflect the selected pieces of the nail image data 304. As described above, this embodiment does not require an operation to drag and drop the pieces of the nail image data 304 one by one in the respective print areas 310 in order to reflect the nail image data 304 to the print area 310. Accordingly, it is possible to save the effort of the user to reflect the images to be printed to the corresponding print areas 310. This embodiment has described the example in which the user performs the operation to select the pieces of the nail image data 304 that the user intends to reflect and then performs the operation to reflect the selected pieces of nail image data 304 to the print areas 310. However, the present invention is not limited only to this configuration. Following the operation to select the pieces of the nail image data 304 that the user intends to reflect, the selected pieces of nail image data 304 may be reflected automatically to the print areas 310. In other words, after the user's selection of the pieces of the nail image data 304 that the user intends to reflect as shown in FIGS. 7A to 7C, the nail application may carry out the processing to reflect the selected pieces of nail image data 304 automatically to the print areas 310.

Back to FIG. 3, the description of the UI screen of the print data generation screen 301 will be continued. The image data cancel button 311 on the print data generation screen 301 shown in FIG. 3 is a button used to cancel the pieces of the nail image data 304 reflected to the print areas 310. As the user presses the image data cancel button 311, the pieces of the nail image data 304 reflected to the print areas 310 are cancelled.

The print button 312 on the print data generation screen 301 in FIG. 3 is a button used for instructing to start a print operation. As the print button 312 is pressed, the nail application generates the print data to be printed on the nails based on the nail image data 304 reflected to the print areas 310, and transmits the generated print data to the printer 151 displayed in the printer name display area 306. The print data is generated by extracting the five print areas 310 from the video image display area 308. The printer 151 performs the printing on the nails based on the print data transmitted from the nail application.

Processing to update the learning model by subjecting the learning model to relearning is executed after the printing. Here, the timing of the relearning and update processing does not have to be after the printing and the processing may be executed before the printing. Details of the relearning will be described later.

<Configuration of Information Processing Apparatus>

Figure 9:
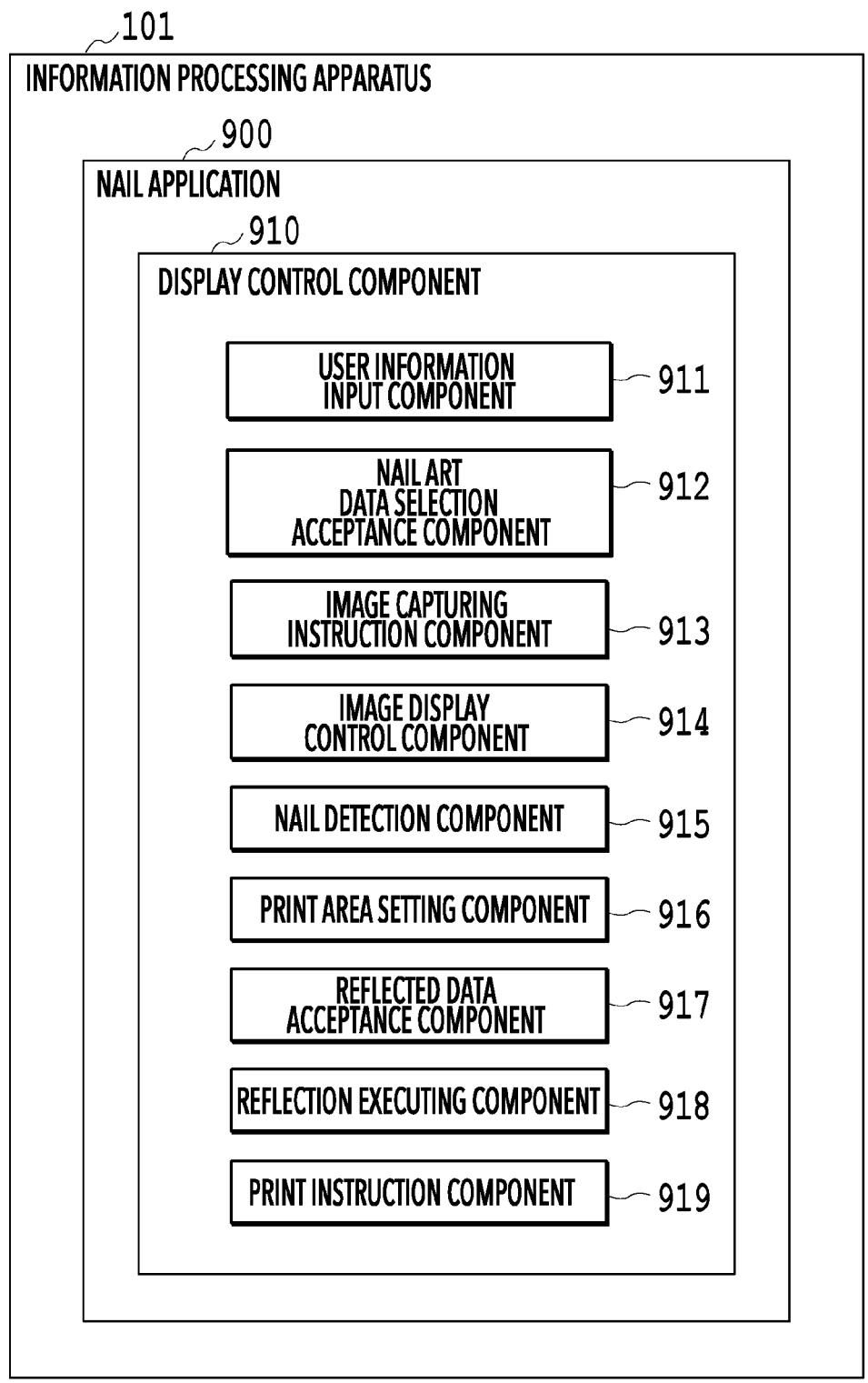
FIG. 9 is a diagram showing an example of functional blocks of an information processing apparatus.

FIG. 9 is a diagram showing an example of functional blocks of the information processing apparatus 101 for implementing the above-described functions. The information processing apparatus 101 includes a nail application 900. As for the nail application 900, the CPU 103 of the information processing apparatus 101 can implement the functions of the nail application 900 by executing a program for the nail application 900 stored in the ROM 104 or the external storage device 106. The nail application 900 includes a display control component 910. The display control component 910 has a function to cause the display unit 108 to display various UI screens including the nail art data selection screen 201 shown in FIGS. 2A to 2C and the print data generation screen 301 shown in FIG. 3. In the meantime, the display control component 910 has a function of the input interface 102 and performs a variety of control in response to operating instructions inputted by the user.

The display control component 910 includes a user information input component 911, a nail art data selection acceptance component 912, an image capturing instruction component 913, an image display control component 914, a nail detection component 915, a print area setting component 916, a reflected data acceptance component 917, a reflection executing component 918, and a print instruction component 919.

As shown in FIG. 2A, the user information input component 911 accepts the input of the user information from the dialog 205 used for inputting the user information. The inputted user information thus accepted is stored in the RAM 105 and the like. As shown in FIG. 2C, the nail art data selection acceptance component 912 accepts the selection of the nail art data 203 by the user and acquires the selected nail art data 203. The image capturing instruction component 913 detects the press of the capture button 307 in FIG. 3 and instructs the printer 151 to capture the video image in response to the detection of the press of the capture button

307. The image display control component 914 displays the image data of the video image transmitted from the printer 151 in the video image display area 308.

The nail detection component 915 detects the nail areas as the print areas by using the learning model (which is also referred to as a nail detection model). The nail detection component 915 may retain the learning model and detect the nail areas by using the retained learning model. Alternatively, the nail detection component 915 may request an external server that retains the learning model to detect the nail areas and use a result of the detection. The nail detection component 915 detects the nail areas outputted from the learning model as the print areas 310, which are outputted as a consequence of inputting the image data and the user information to the learning model.

The print area setting component 916 sets the print areas 310 on the video image display area 308 in accordance with an instruction from the user. In the case where the user issues an instruction to change any of the nail areas detected by the nail detection component 915, the print area setting component 916 sets the nail areas after the change as the print areas 310. In the case where the user does not issue an instruction to change any of the nail areas detected by the nail detection component 915, the print area setting component 916 sets the original nail areas detected by the nail detection component 915 as the print areas 310.

The reflected data acceptance component 917 associates the pieces of the nail image data 304 with the print areas 310 and accepts the selection by the user regarding the pieces of the nail image data 304 to be reflected to the print areas 310. The reflection executing component 918 reflects the nail image data 304 having selected by the user to the corresponding print areas 310. The print instruction component 919 generates the print data for causing the printer 151 to print the nail image data 304 reflected to the print areas 310 and transmits the print data to the printer 151.

<Processing Flow>

Figure 10:
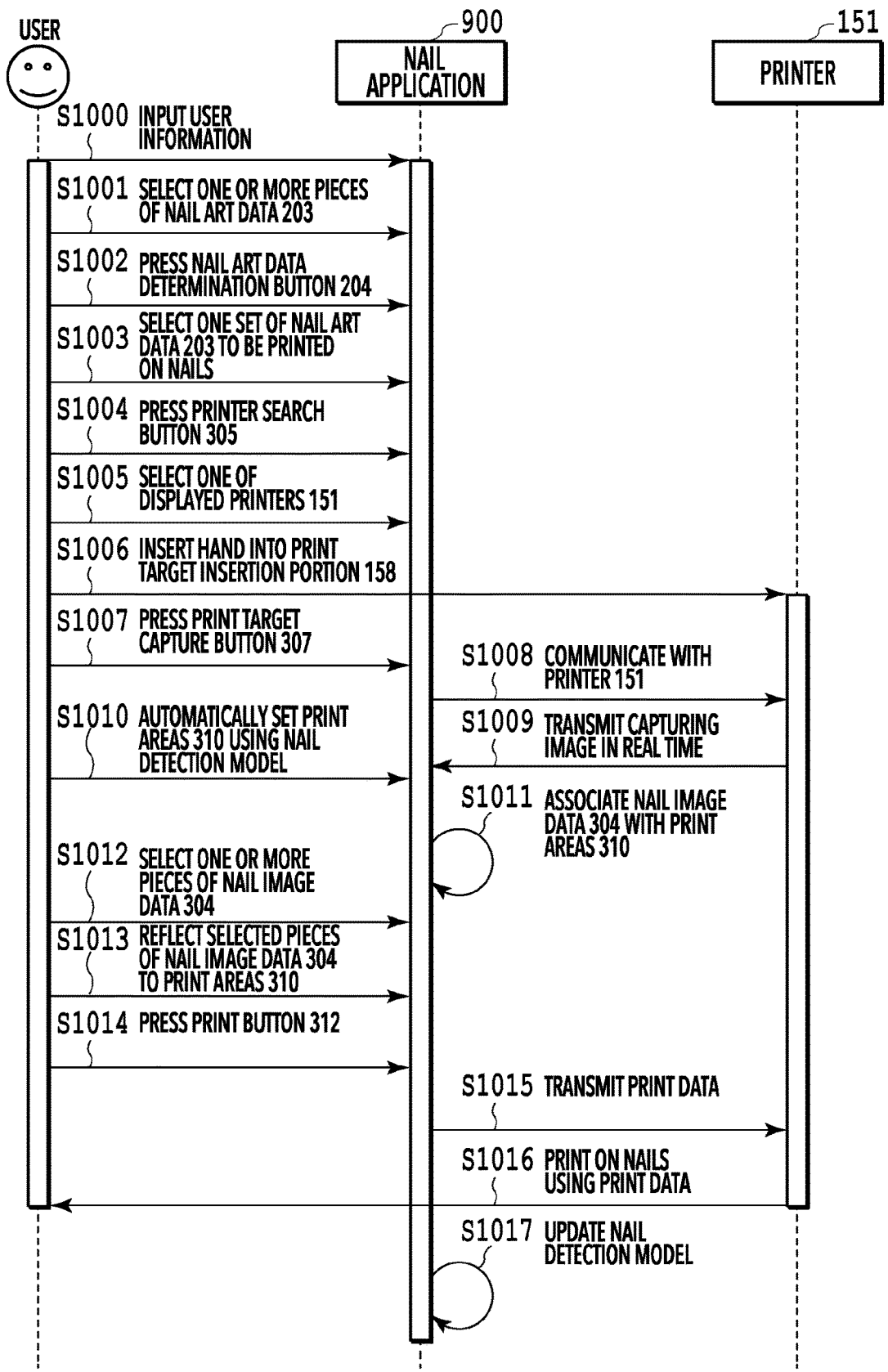
FIG. 10 is a sequence diagram showing an example of processing.

FIG. 10 is a sequence diagram showing an example of the processing in this embodiment. The processing of the nail application 900 of FIG. 10 is implemented by causing the CPU 103 of the information processing apparatus 101 to load program codes that are stored in the ROM 104 or the external storage device 106 into the RAM 105 and to execute the program codes. Alternatively, part or all of the functions of steps in FIG. 10 may be implemented by using hardware such as an ASIC and an electronic circuit. Note that the code S used in the following description of the processing means a step in the sequence. FIG. 10 describes a flow in which the user activates the nail application 900 and the print engine 155 prints the nail arts on the nails inserted into the print target insertion portion 158 under the control of the nail application 900.

The user activates the nail application 900 to begin with. After the user activates the nail application 900, the display control component 910 displays the screen inclusive of the dialog 205 as shown in FIG. 2A in S1000. The user inputs the user information and the user information input component 911 accepts the input of the user information. If the user information has been registered in advance, the user information input component 911 may acquire the registered user information instead. Meanwhile, the processing by the user information input component 911 does not always have to be carried out at the start of the series of processing. The processing by the user information input component 911 need only be completed before the setting of the print areas 310 by using the nail detection model in S1010 to be described later.

In S1001, the display control component 910 displays the selection screen 201 shown in FIG. 2B. The nail art data selection acceptance component 912 accepts selection of one or more pieces of the nail art data 203 in the nail art data display area 202 on the selection screen 201.

As the user presses the nail art data determination button 204 after selecting one or more pieces of the nail art data 203, the display control component 910 detects the press of the button and displays the print data generation screen 301 shown in FIG. 3 on the display unit 108 in S1002. As the print data generation screen 301 shown in FIG. 3 is displayed on the display unit 108, the one or more pieces of the nail art data 203 selected by the user in S1001 are displayed in the selected data display area 302 in the print data generation screen 301.

The user selects one set of the nail art data 203 to be printed on the nails out of the data in the selected data display area 302. In S1003, the nail art data selection acceptance component 912 accepts the selected set of the nail art data 203 from the user. The display control component 910 displays the nail art data 203 selected by the user in the nail art data determination area 303.

After the nail art data to be printed on the nails is determined in S1003, the display control component 910 accepts the press of the printer search button 305 in S1004. As the printer search button 305 is pressed, the nail application 900 searches for the printers 151 that can communicate with the nail application. The display control component 910 displays the printer list 401 representing the search result on the display unit 108.

As the printer list 401 is displayed on the display unit 108, the user designates one of the printers 151. In S1005, the display control component 910 selects the printer 151 designated by the user.

In S1006, the user inserts the hand of the user into the print target insertion portion 158 provided to the printer 151 selected in S1005. In this instance, in order to print the nail art data 203 selected in S1003 more colorfully, a jelly liquid is coated on the nails of the user in advance. This liquid will be hereinafter referred to as a base coating. There are several colors for this base coating, including white, translucent, and the like. In the meantime, the nail application 900 may display a message for encouraging the user to insert the hand into the printer 151 at this timing.

In S1007, the image capturing instruction component 913 accepts the press of the capture button 307 by the user. In S1008, the nail application 900 communicates with the printer 151 selected in S1005 on the condition that the capture button 307 is pressed by the user. Then, the nail application 900 instructs the printer 151 to capture an image with the image capturing unit 157. Here, the nail application 900 may transmit a camera activation job to the printer 151 in S1008. Then, the printer 151 may activate the image capturing unit 157 and start image capturing based on reception of this camera activation job.

In S1009, the printer 151 transmits the video image capturing with the image capturing unit 157 to the nail application 900. This video image is displayed in the video image display area 308 on the print data generation screen 301 shown in FIG. 3 almost in real time. The video image captured with the image capturing unit 157 is displayed in the video image display area 308 almost in real time. At this point, the video image display area 308 is in the state of displaying the video image of the finger tips of the user inserted into the print target insertion portion 158.

In the state where the video image is displayed in the video image display area 308 in S1009, the user presses the area set button 309 in S1010. As the nail detection component 915 detects the press of the area set button 309, the nail detection component 915 detects the nail areas by using the nail detection model. Specifically, the nail detection component 915 inputs the user information as well as the image data of the fingers inclusive of the nails, thereby detecting the nail areas outputted from the nail detection model. The print area setting component 916 sets the nail areas detected by the nail detection component 915 as the print areas 310. As described with reference to FIGS. 5A to 5C, the print area setting component 916 sets the nail areas detected by using the nail detection model onto the video image display area 308 as the print areas 310. Here, the print area setting component 916 can also change the print areas 310 outputted from the nail detection model in response to designation by the user.

Note that the number of the settable print areas 310 is assumed to be set to a predetermined value in this embodiment. Since this embodiment deals with the number of the nails on one hand, the predetermined value is set to "5". The predetermined value corresponds to the number of pieces of nail image data included in each set of the nail art data 203. This embodiment will describe an example in which the user sets the same number of the print areas 310 as the predetermined value. In other words, five print areas 310 are assumed to be set in this embodiment.

After the print areas 310 are set by the print area setting component 916, the reflected data acceptance component 917 associates the five types of the nail image data 304 displayed in the nail art data determination area 303 with the five pieces of the set print areas 310 in S1011. In this instance, the user can change the association of the nail image data 304 with the print area 310 as described with reference to FIGS. 6A to 6C as needed.

After the association of the nail image data 304 with the print areas 310 is completed in S1011, the reflected data acceptance component 917 accepts the selection of the nail image data 304 by the user as shown in FIGS. 7A to 7C in S1012. The user selects one or more pieces of the nail image data 304 from the nail art data determination area 303 after completing the association. The reflected data acceptance component 917 accepts this selection by the user. Here, the nail application may display a message for encouraging the user to select the nail image data that the user intends to print.

In S1013, the reflection executing unit reflects the selected nail image data 304 accepted in S1012 to the print areas 310. As described with reference to FIGS. 7A to 8B, for example, the user can reflect one or more pieces of the nail image data 304 to the corresponding print areas 310. For instance, if the user selects all of the nail image data 304 in the nail art data determination area 303, then all of the nail image data 304 is reflected to the print areas 310. In the case where part of the nail image data 304 in the nail art data determination area 303 is selected, the selected part of the nail image data 304 is reflected to the print areas 310. The unselected pieces of the nail image data 304 are not reflected to the print areas 310 corresponding to these pieces of the nail image data 304. In other words, on the video image display area 308, the nail images are displayed in the print areas 310 to which the pieces of the nail image data 304 are reflected whereas the video image of the nails of the user is displayed without change in the print areas 310 to which the pieces of the nail image data 304 are not reflected.

In S1014, the print instruction component 919 generates the print data in which the applicable pieces of the nail image data 304 are reflected to the print areas 310. For example, the user presses the print button 312 after the user checks the reflected contents of the nail image data 304 to the print areas 310. The print instruction component 919 generates the print data in response to the press of the print button 312. Here, the nail application may display a message stating "do not move the hand inserted into the printer 151".

In S1015, the nail application 900 transmits the generated print data to the printer 151. In S1016, the printer 151 performs the printing based on the transmitted print data. As a consequence, the nail images are printed on the nails of the user. Here, the printer 151 continues to capture the nails during the printing. If the printer 151 detects detachment of the hand from the printer 151 before the printing is completed, the printer 151 may suspend the printing. Alternatively, the nail application 900 may detect the detachment of the hand from the printer 151 before completion of the printing and instruct the printer 151 to suspend the printing.

In S1017, the nail application 900 updates the nail detection model. The nail application 900 puts the image of the hand inclusive of the nails of the user used for printing and the user information together into customer information, and uses this customer information for the relearning of a nail detection model 1102. Here, the relearning may be carried out in the course of the processing shown in FIG. 10 or may be independently carried out at a different timing from the processing of FIG. 10.

<Learning Model>

Next, a description will be given of the learning model (the nail detection model) used by the nail detection component 915. In this embodiment, the learning model generated by machine learning is used as a method of automatically detecting the nail areas. Examples of specific algorithms applicable to the machine learning include the nearest neighbor algorithm, the Naïve Bayes algorithm, the decision tree algorithm, the support vector machine algorithm, and the like. Another example of the applicable algorithm is deep learning that is designed to autonomously generate feature values and coupling weight coefficients for learning by use of a neural network. An available one of the aforementioned algorithms can be applied to this embodiment.

Figure 11:
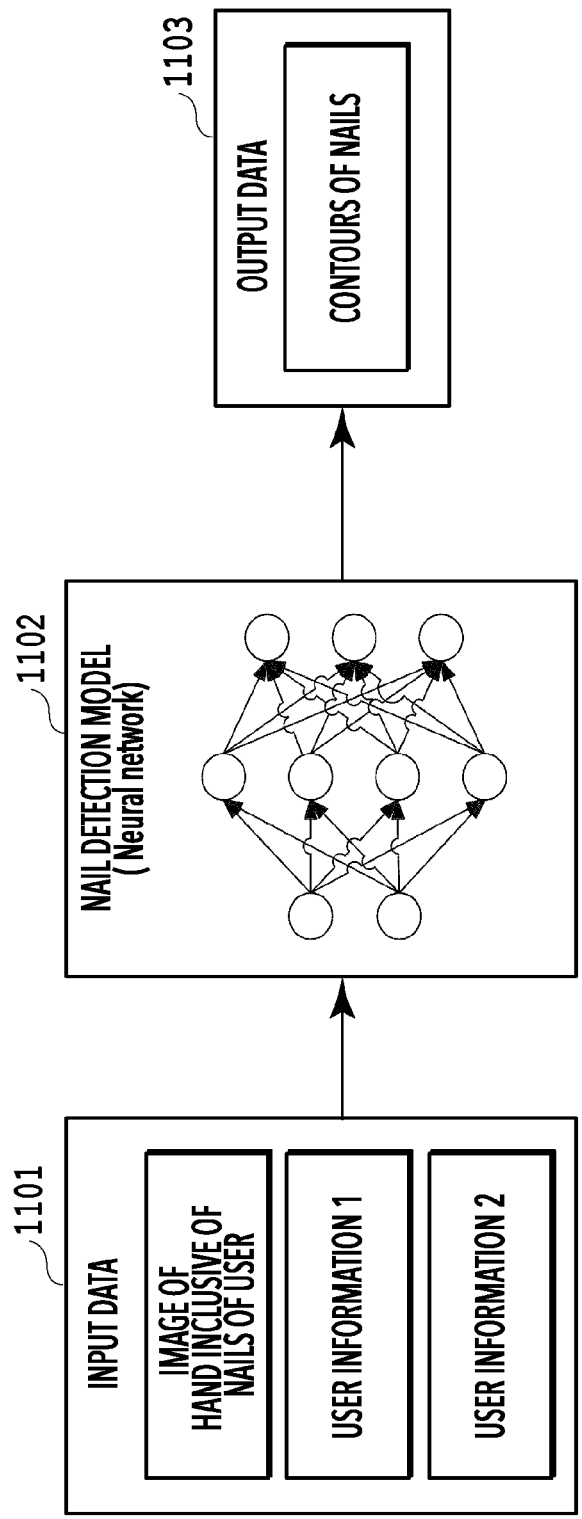
FIG. 11 is a diagram for explaining an example of learning by using neural network data for a learning model.

FIG. 11 is a diagram for explaining an example of learning by using the neural network data for the learning model. Specifically, a learning model using the neural network will be defined as the learning model in this embodiment. FIG. 11 shows a nail detection model 1102 as the learning model. The neural network includes coupling weight coefficients between nodes and the like, and the learning is carried out by adjusting the coupling weight coefficients between nodes and the like. In the case where input data 1101 is inputted, the nail detection model 1102 conducts learning so as to derive output data 1103. The input data 1101 of this embodiment includes the image of the hand inclusive of the nails of the user as well as the user information. The output data 1103 is data representing the contours of the nails.

Figure 12A:
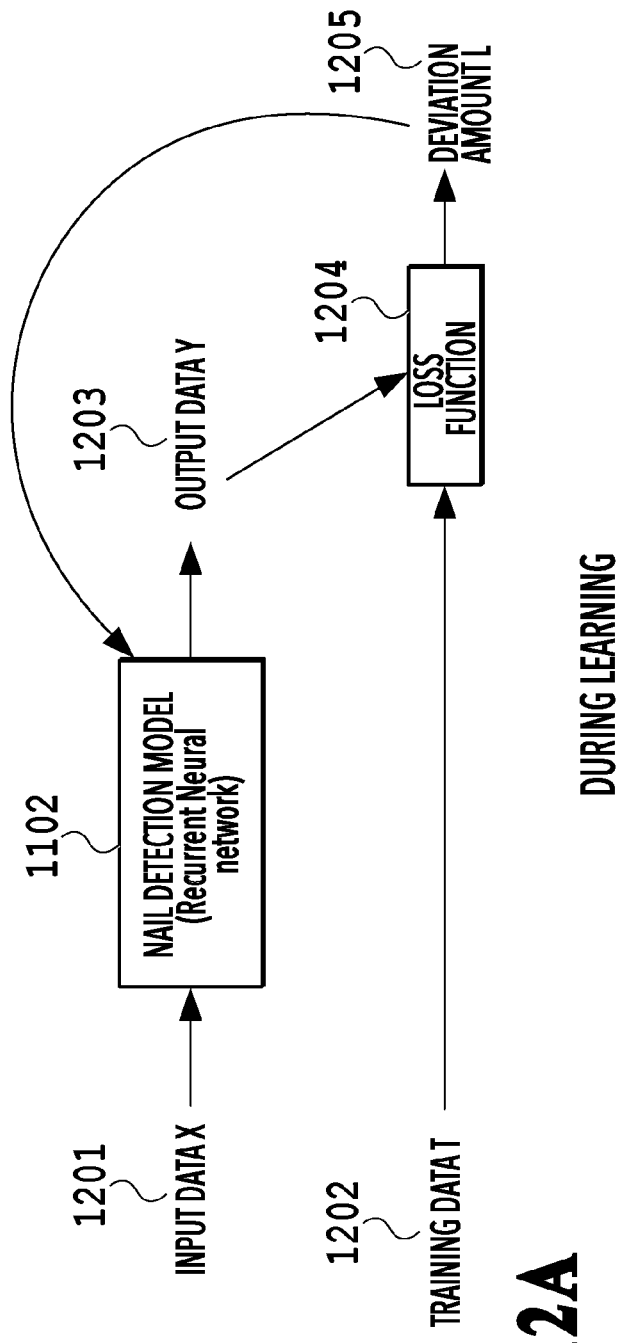
FIGS. 12A and 12B are conceptual diagrams showing input and output structures of a nail detection model during learning and during inference.
Figure 12B:
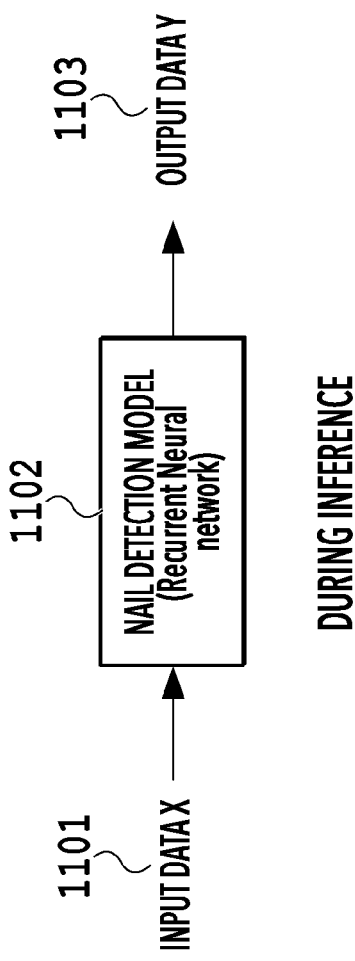

FIGS. 12A and 12B are conceptual diagrams showing input and output structures of the nail detection model 1102 during the learning and during inference. FIG. 12A shows relations of the nail detection model 1102 with the input and output data thereof during the learning. The learning data used during the learning includes input data X (1201) and training data T (1202). The input data X (1201) is data on an input layer of the nail detection model 1102. The input data X in this embodiment is the data including the image of the hand inclusive of the nails of the user as well as the user information. As the input data X is inputted to the nail detection model 1102, the data indicating the nail areas corresponding to the image is outputted as output data Y (1203). During the learning, the data indicating the nail areas, which represents a correct answer to the input data X, is provided as the training data T (1202). Accordingly, a deviation amount L (1205) of a result of prediction from the correct answer (which is also referred to as a prediction error) is obtained by providing a loss function 1204 with the output data Y and the training data T. Here, the data indicating the nail areas may be any of data indicating coordinates in the image, vector data, and image data obtained by processing an image in such a way as to indicate the nail areas therein. The following description will be made on the assumption that the data indicating the nail areas is the image data obtained by processing the image of the hand in such a way as to indicate the nail areas therein.

During the learning, RNN parameters and the like (the coupling weight coefficients between the nodes and the like) in the nail detection model 1102 are updated in such a way as to reduce the deviation amount L (1205) relative to numerous pieces of the learning data. Although this embodiment has described the example of using the RNN for the machine learning algorithm adopted therein, different types of the recurrent neural network may be used instead. For example, any of a long short-term memory (LSTM), a bidirectional RNN, and the like may be used instead. In addition, a combination of two or more network structures may be used as the network structure. For example, a convolutional neural network (CNN) may be combined with a recurrent neural network such as the RNN and the LSTM or with an automatic encoder and the like.

FIG. 12B shows relations of the nail detection model 1102 with the input and output data thereof during the inference. The input data X (1101) is data on the input layer of the nail detection model 1102. The input data X (1101) during the inference is also the data including the image of the hand inclusive of the nails of the user as well as the user information. As the input data X is inputted to the nail detection model 1102, the data indicating the nail areas corresponding to the image is outputted as the output data Y (1103). During the inference, the output data Y is used as an inference result. Specifically, the nail detection component 915 acquires the output data Y (1103) as the data indicating the nail areas. Here, the nail detection model 1102 during the inference has been described to include the same network structure as that of the nail detection model 1102 during the learning. However, the nail detection model 1102 can also be prepared by extracting only the portions necessary for the inference. In this way, it is possible to reduce an amount of data in the nail detection model 1102 and to reduce the time for the inference processing.

In this embodiment, the following data is used as the learning data to be learned by the nail detection model 1102. Specifically, the learning data includes images of hands inclusive of nails of learning targets (users) and information on the learning targets linked to the images of the hands of the learning targets which collectively serve as the input data, and images obtained by processing the images of the hands of the learning targets so as to indicate the nail areas which serve as the training data. Here, the fingers in each image of the hand inclusive of the nails of the learning target may be of any number. In addition, either images of right hands or images of left hands are acceptable.

This embodiment will describe an example of using ages of the learning targets as a specific example of the information on the learning targets linked to the images of the hands of the learning targets. For instance, the nails of children are small but those nails tend to grow larger as the children get older. Accordingly, the ages are factors that are likely to reflect differences in size of the nails. This is why this embodiment uses the ages of the learning targets as the information linked to the nails of the learning targets. The pieces of the information on the learning targets used as the learning data may be of any number. Meanwhile, the information on the learning targets may include nationalities (or geographical areas) or genders. As with the ages, the nationalities (the geographical areas) and the genders are also likely to reflect the differences in size of the nails and may therefore be used as the information linked to the nails of the learning targets.

An example of a learning data structure shown in Table 1 represent an exemplary case of a learning data set prepared by using the images of the hands inclusive of the nails of the users and user attributes (the ages in this case) collectively as the input data while using the images indicating the nail areas as the training data corresponding to the input data. A learning unit configured to generate the nail detection model 1102 (the learning model) generates the nail detection model 1102 by using the above-described learning data.

TABLE 1

| Learning data ID | Input data | | Training data |
|---|---|---|---|
| | Image of hand inclusive of nails of learning target | Age | Image indicating nail areas |
| 1 | Sample.jpg | 26 | Sample_correct.jpg |
| 2 | Sample2.jpg | 30 | Sample2_correct.jpg |
| 3 | Sample3.jpg | 18 | Sample3_correct.jpg |
| 4 | Sample4.jpg | 36 | Sample4_correct.jpg |
| * | * | * | * |
| * | * | * | * |
| * | * | * | * |
| N | XXXXX.jpg | N | XXXXX_correct.jpg |

FIG. 11 that has been described earlier shows the example of conducting the inference while using the nail detection model 1102 generated by the learning. Specifically, the nail detection model 1102 inputs the image of the hand inclusive of the nails of the user generated from video image and the user information linked to the image of the hand of the user collectively as the input data 1101, thereby outputting the data indicating the nail areas as the output data 1103. In this embodiment, the nail detection model 1102 is assumed to be incorporated into the nail detection component 915 of the nail application 900. Here, generation of the nail detection model 1102 and the relearning to be described later may be carried out by the nail application 900. Alternatively, the nail detection model 1102 retained by the nail application 900 may be subjected to learning by an instruction from a not-illustrated server. In the meantime, the nail detection model 1102 retained by the nail application 900 may be updated by using a nail detection model subjected to learning by the non-illustrated server.

Next, a description will be given of update processing (the relearning) of the nail detection model 1102 that may be carried out after the printing. After the printing on the nails, the image of the hand that the user used for the printing, the stored user information, and the setting of the print areas 310 are put together into the customer information and stored inside the nail application 900. Such a storage area is not limited only to the inside of the nail application 900, and the customer information may be stored in another portion in the information processing apparatus 101 or in the database on the not-illustrated server. As described above, the user may use the nail areas detected by the nail detection model 1102 as the print areas 310 without change or may change the detected nail areas and then use the changed nail areas as the print areas 310. Accordingly, it is possible to further improve detection accuracy of the nail areas in the case where the information used in the printing is used for the relearning.

The stored customer information is inputted as the learning data to the nail detection model 1102 at a predetermined timing, thus subjecting the nail detection model 1102 to the relearning. Specifically, the nail detection model 1102 is subjected to the relearning while using the image of the hand used for printing by the user as well as the user information collectively as the input data and using the data indicating the print areas 310 as the training data. The nail application 900 may conduct the relearning or another not-illustrated server may conduct the relearning. Although the information obtained by putting the image of the hand that the user used for the printing, the stored user information, and the setting of the print areas 310 together has been described as the customer information, the present invention is not limited only the foregoing. Depending on the way how the information on the print areas 310 is handled, the customer information may be obtained by just putting the stored user information and the setting of the print areas 310 together. This is due to the following reason. Specifically, if the print areas 310 are located in the image of the hand that the user used for the printing and processed to indicate the nail areas (the print areas) in this image, then it is possible to generate the learning data at the time of the relearning from the image that indicates the print areas 310.

Here, in the case where the user sets the print areas 310 for only three of the fingers, for instance, the original areas for the rest of the fingers detected by the nail detection component 915 may be included in the setting of the print area 310 used for the relearning.

The user may set the predetermined timing to carry out the relearning. This timing may be defined as a timing that a certain number of pieces of customer information are stored. The user may conduct the relearning at any time. Alternatively, certain time and date may be designated as this timing. In the meantime, the customer information may be immediately used as the learning data as soon as the information is stored.

As described above, according to this embodiment, the nail detection model 1102 is subjected to the learning while using the image of the hand inclusive of the nails of the user, the user information on this user, and the image indicating the nail areas in this image collectively as the learning data. This makes it possible to improve accuracy of detection of the nail areas of the user by using the nail detection model 1102. In addition, by using the nail detection model 1102 subjected to the learning as described above, it is possible to accurately detect the nail areas of the user. Moreover, it is possible to detect the nails even at higher accuracy by subjecting the nail detection model 1102 to the relearning by using the print areas 310 actually set by the user.

Second Embodiment

The first embodiment has described the example in which the nail application 900 retains the nail detection model 1102 and the nail detection component 915 of the nail application 900 detects the nail areas by using the retained nail detection model 1102. Meanwhile, this embodiment will describe an example in which the nail detection model 1102 is retained in a server apparatus that is different from the information processing apparatus 101 used for activating the nail application 900.

Figure 13:
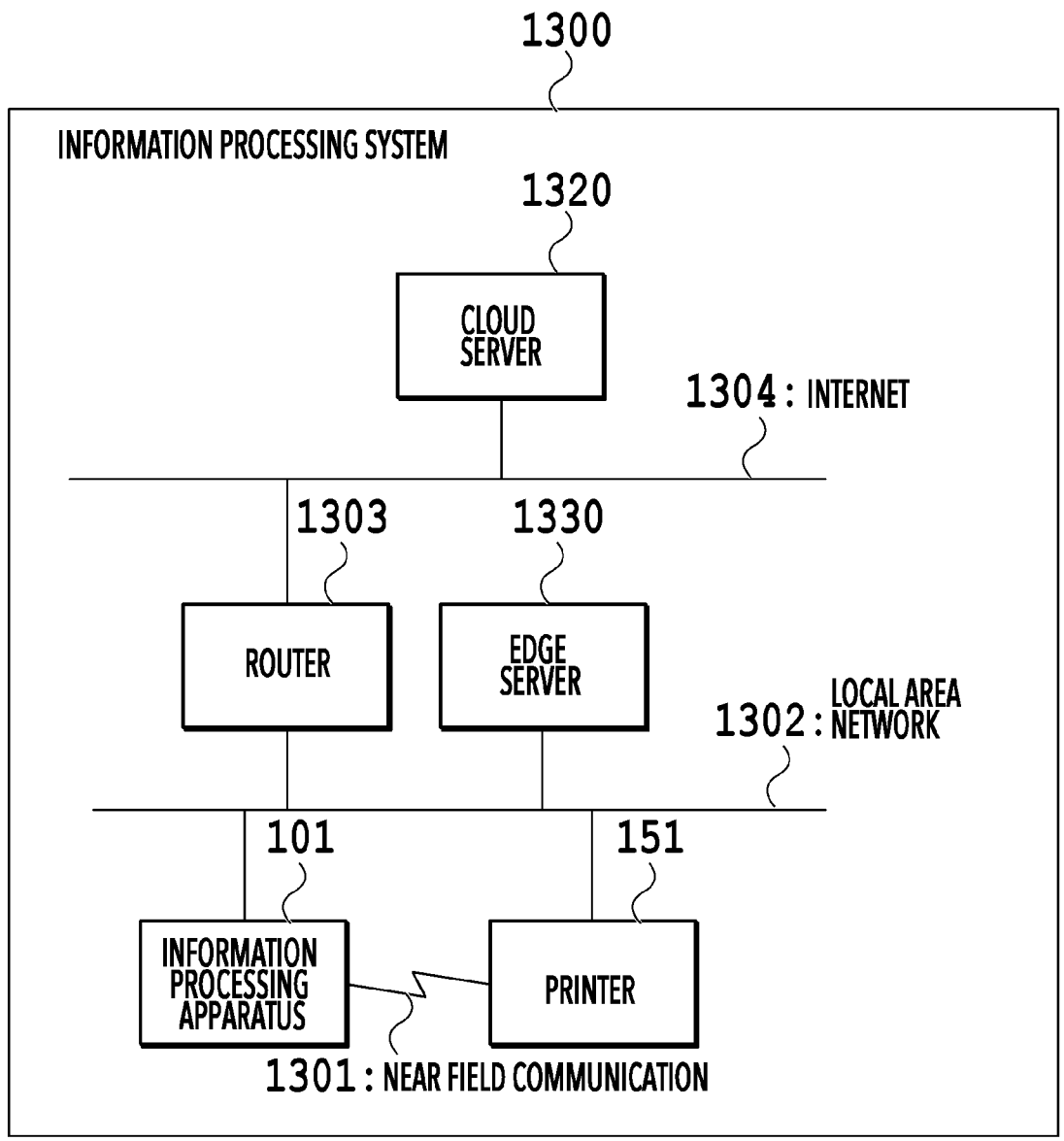
FIG. 13 is a diagram showing a configuration of an information processing system.

FIG. 13 is a diagram showing a configuration of an information processing system 1300 of this embodiment. The information processing system 1300 includes a cloud server 1320 connected through a local area network 1302 or the Internet 1304, an edge server 1330, the information processing apparatus 101, and the printer 151. The information processing apparatus 101 and the printer 151 are connected to each other through the local area network 1302, and can therefore be connected to the Internet 1304 through a router 1303 installed in the local area network 1302.

The information processing apparatus 101 and the edge server 1330 can communicate with the cloud server 1320 via the Internet 1304 that is connected through the router 1303. The edge server 1330 and the information processing apparatus 101 can communicate with each other via the local area network 1302. The information processing apparatus 101 and the printer 151 can also communicate with each other via the local area network 1302. In the meantime, the information processing apparatus 101 and the printer 151 can communicate with each other by using near field communication 1301. The use of wireless communication based on the Bluetooth (a registered trademark) standards or the NFC standards can be thought of as the near field communication 1301.

Each of the cloud server 1320 and the edge server 1330 is a sort of an information processing apparatus, which may adopt the same hardware configuration as the example illustrated in FIG. 1A. In this embodiment, the learning of the nail detection model 1102 is carried out either by the cloud server 1320 or the edge server 1330. In this case, the information processing apparatus 101 that activates the nail application 900 need not be provided with the GPU 110 and the server that conducts the learning may include a GPU instead.

Figure 14:
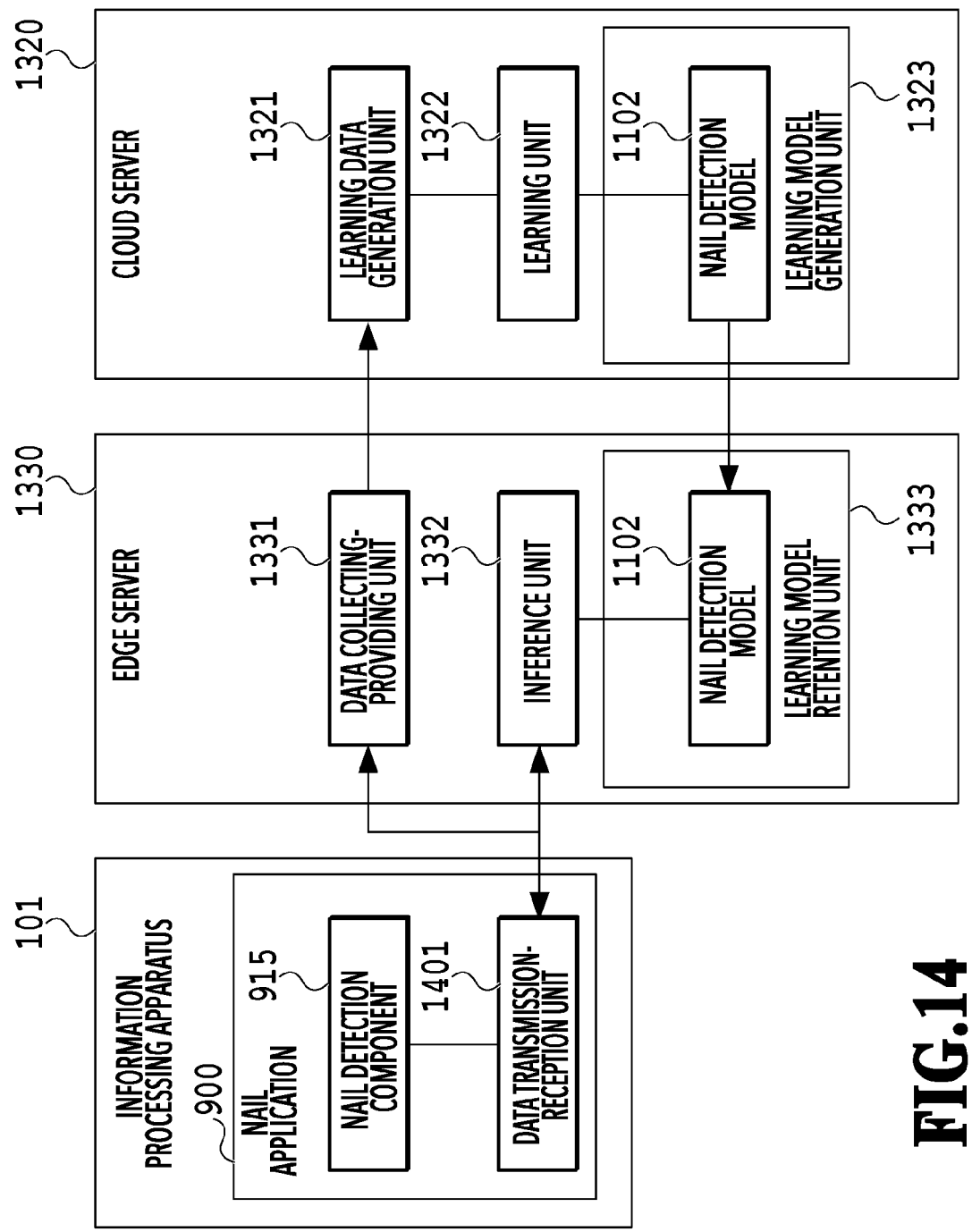
FIG. 14 is a diagram showing a software configuration of the information processing system.

FIG. 14 is a diagram showing a software configuration of the information processing system 1300. FIG. 14 mainly illustrates modules in the software configuration which are involved in the learning and the inference in this embodiment, and the rest of software modules are not illustrated therein. For instance, illustration of the operating system that runs on the information processing apparatus 101 or the servers, a variety of middleware, applications for maintenance, and the like is omitted in FIG. 14.

The cloud server 1320 includes a learning data generation unit 1321, a learning unit 1322, and a learning model generation unit 1323. The learning data generation unit 1321 is a module that generates the learning data processable by the learning unit 1322 from data received from outside. For example, the learning data generation unit 1321 generates the input data X and the training data T as described in the first embodiment. Here, in the case of inputting the input data X and the training data T as described in the first embodiment to the learning data generation unit 1321, the learning data generation unit 1321 may be the module that forwards the input data directly to the learning unit 1322. On the other hand, in the case of processing and obtaining the relearning data as described in the first embodiment, the learning data generation unit 1321 may process the relevant data.

The learning unit 1322 is a program module that executes the learning of the nail detection model 1102 retained by the learning model generation unit 1323 while using the learning data received from the learning data generation unit 1321. Specifically, the nail detection model 1102 is generated in the learning model generation unit 1323 as a consequence of the learning by the learning unit 1322. The nail detection model 1102 learned by the learning unit 1322 is distributed to the edge server 1330 and managed by the edge server 1330. The nail detection model 1102 managed by the edge server 1330 is used for the inference processing to be carried out by the edge server 1330.

The edge server 1330 includes a data collecting-providing unit 1331, an inference unit 1332, and a learning model retention unit 1333 that retains the nail detection model 1102. The data collecting-providing unit 1331 is a module that transmits the data received from the nail application 900 to the cloud server 1320 as a data group to be used in the learning. The inference unit 1332 executes inference based on the data transmitted from the nail application 900 while using the nail detection model 1102 retained by the learning model retention unit 1333, and returns a result of the inference to the nail application 900. The data transmitted from the nail application 900 is the data serving as the input data X to the inference unit 1332.

The nail detection model 1102 retained by the learning model retention unit 1333 is used for the inference conducted by the edge server 1330. The learning model retention unit 1333 stores the nail detection model 1102 accumulated in and distributed from the cloud server 1320. The nail detection model 1102 stored in the learning model retention unit 1333 may include all of the nail detection model 1102 generated by and distributed from the cloud server 1320. Alternatively, the nail detection model 1102 stored therein may be an extracted and distributed portion of the nail detection model 1102 which is necessary for the inference by the edge server 1330.

The nail application 900 includes the nail detection component 915 and a data transmission-reception unit 1401. The nail application 900 includes other structures described with reference to FIG. 9. However, explanations of those structures will be omitted herein. The data transmission-reception unit 1401 is a module that requests the learning or the inference from the edge server 1330. During the learning, the data transmission-reception unit 1401 transmits the data used for the learning to the data collecting-providing unit 1331 of the edge server 1330 upon request from the nail detection component 915. Meanwhile, during the inference, the data transmission-reception unit 1401 transmits the data used for the inference to the edge server 1330 upon request from the nail detection component 915, then receives the result and returns the result to the nail detection component 915.

FIG. 14 has described the example in which the nail detection model 1102 learned and generated by the cloud server 1320 is distributed to the edge server 1330 and the edge server 1330 uses the distributed nail detection model 1102 for the inference. However, the configuration as to which one of the cloud server 1320, the edge server 1330, and the nail application 900 is supposed to carry out the learning or the inference may be determined depending on allocation of hardware resources or the magnitude of an amount of calculation, an amount of data communication, and the like. Alternatively, this configuration may be dynamically changed depending on the allocation of hardware resources or on an increase or decrease in the amount of calculation or the amount of data communication. In the case where the executant of the learning is different from the executant of the inference, the inference side may be configured to use a logic that is used only in the inference, or to reduce a capacity of the nail detection model 1102. This makes it possible to execute the inference faster.

As described above, the nail application 900 can transmit the image of the hand inclusive of the nails of the user as well as the user information on this user to the nail detection model 1102 retained by a different server, and use the data on the nail areas received from the nail detection model 1102. Moreover, either the edge server 1330 or the cloud server 1320 collects the data on respective users and uses the collected data for the learning. Thus, the nail application can use the nail detection model that is adaptable to various users.

Other Embodiments

The aforementioned embodiments have described the example of the printer 151 configured to allow insertion of one hand into the print target insertion portion 158. However, the present invention is not limited only to this configuration. For instance, the present invention is applicable to a printer that is typically installed in a store or the like and designed to allow insertion of both hands. In this case, a staff member at the store or the like may operate the printer.

The aforementioned embodiments have described the example of printing the images (patterns) as the nail arts. In another aspect, a structure including a design may be formed on a nail as a nail art by using the image data as well as geometry data that represents a three-dimensional structure and the like.

The aforementioned embodiments have described the mode of inserting the hand into the printer 151 and printing directly on the nails. However, other modes are also applicable. For instance, the above-described embodiments are applicable to a case of printing on an object such as a seal to be put on the nails while using the printer.

The aforementioned embodiments have described the example of detecting the nail areas in the case of conducting the print processing by use of the nail printer. The processing to detect the nail areas is applicable not only to the processing by the nail printer but also to other prescribed processing. For instance, the above-described embodiments may be applied to a case of conducting various diagnoses on the nails by means of image processing and the like.

Meanwhile, as a consequence of automatic detection of the nail areas, a treatment to coat the base coating on the nails may also be carried out automatically. In addition, the above-described processing to detect the nail areas may be applied to a case where processing to remove the nail arts is automatically carried out.

The aforementioned embodiments have described the example in which the print target is the nail. However, the present invention is not limited only to this configuration. The above-described embodiments are applicable similarly to a case of printing on part of the body of a user where a print area is variable depending on attributes of the user. For instance, the present invention may be applied to processing to print a prescribed art on a finger instead of a nail. Meanwhile, the present invention is also applicable to processing to detect part of the body such as the cheek as a print area for conducting face painting.

A computer may include one or more processors or circuits. Moreover, a network of two or more separate computers or of two or more separate processors or circuits may be provided in order to read and execute computer-executable commands. Such a processor or a circuit may include any of a central processing unit (CPU), a micro processing unit (MPU), a graphics processing unit (GPU), an application specific integrated circuit (ASIC), and a field programmable gate array (FPGA). In the meantime, the processor or the circuit may include any of a digital signal processor (DSP), a data flow processor (DFP), and a neural processing unit (NPU).

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-239150, filed Dec. 27, 2019, which is hereby incorporated by reference wherein in its entirety.

What is claimed is:

1. A method of controlling an information processing apparatus, comprising:
    an acquiring step of acquiring image data of a finger inclusive of a nail of a user and user information on the user, the user information being information independent of the acquired image data;
    a detecting step of detecting a nail area in the image data acquired in the acquiring step based on data indicating the nail area in the image data to be outputted from a learning model as a consequence of inputting the image data and the user information acquired in the acquiring step to the learning model;
    a processing step of changing the nail area detected in the detecting step in accordance with an operation by a user and performing prescribed processing on the changed nail area; and
    an outputting step of outputting data for subjecting the learning model to relearning in accordance with the prescribed processing performed in the processing step,
    wherein in the outputting step, as data for subjecting the learning model to relearning, data including the nail area on which the prescribed processing has been performed, the nail area on which the prescribed processing has not been performed, and the user information acquired in the acquiring step is output.

2. The method of controlling an information processing apparatus according to claim 1, wherein the learning model is a learning model subjected to learning in such a way as to output the data indicating the nail area in the inputted image data in response to the input of the image data of the finger inclusive of the nail of the user and the user information on the user.

3. The method of controlling an information processing apparatus according to claim 1, wherein
    the learning model is a learning model subjected to learning by use of learning data including
        the image data of the finger inclusive of the nail of the user and the user information on the user as input data, and
        the data indicating the nail area in the inputted image data as training data.

4. The method of controlling an information processing apparatus according to claim 1, further comprising:
    a processing step of changing the nail area detected in the detecting step in accordance with an operation by a user and performing prescribed processing on the changed nail area.

5. The method of controlling an information processing apparatus according to claim 1, wherein the data for subjecting the learning model to relearning is outputted in the outputting step to a database configured to accumulate the data.

6. The method of controlling an information processing apparatus according to claim 1, wherein the prescribed processing is processing to output a print instruction to perform printing on the nail area.

7. The method of controlling an information processing apparatus according to claim 1, wherein the user information includes at least one of a nationality, a geographical area, a gender, and an age.

8. The method of controlling an information processing apparatus according to claim 1, wherein the image data to be inputted to the learning model in the detecting step is image data captured with an image capturing device.

9. An information processing apparatus comprising:
    one or more processors; and
    one or more memories storing instructions that, when executed by the one or more processors, cause the information processing apparatus to perform operations including:
    acquiring image data of a finger inclusive of a nail of a user and user information on the user, the user information being information independent of the acquired image data;
    detecting a nail area in the image data acquired in the acquiring based on data indicating the nail area in the image data to be outputted from a learning model as a consequence of inputting the image data and the user information acquired in the acquiring unit to the learning model;
    changing the nail area detected in the detecting in accordance with an operation by a user and performing prescribed processing on the changed nail area; and
    outputting data for subjecting the learning model to relearning in accordance with the prescribed performed processing in the processing,
    wherein in the outputting, as data for subjecting the learning model to relearning, data including the nail area on which the prescribed processing has been performed, the nail area on which the prescribed processing has not been performed, and the user information acquired in the acquiring is outputted.

\* \* \* \* \*